US012472655B2

(12) United States Patent
Remin

(10) Patent No.: US 12,472,655 B2
(45) Date of Patent: Nov. 18, 2025

(54) QUILTING TEMPLATES AND METHOD OF USING SAME

(71) Applicant: Lauri Kim Remin, Edmonton (CA)

(72) Inventor: Lauri Kim Remin, Edmonton (CA)

( * ) Notice: Subject to any disclaimer, the term of this patent is extended or adjusted under 35 U.S.C. 154(b) by 508 days.

(21) Appl. No.: 17/930,407

(22) Filed: Sep. 7, 2022

(65) Prior Publication Data

US 2024/0075644 A1 Mar. 7, 2024

(51) Int. Cl.
*B26D 7/00* (2006.01)
*B26F 1/38* (2006.01)

(52) U.S. Cl.
CPC .......... *B26D 7/0006* (2013.01); *B26F 1/3853* (2013.01)

(58) Field of Classification Search
CPC ............................ B26D 7/0006; B26F 1/3853
USPC ......................... 33/11, 12, 13, 563, 556, 566
See application file for complete search history.

(56) References Cited

U.S. PATENT DOCUMENTS 3,090,533 A * 5/1963 Claeys ...................... D06J 1/00 223/35
3,898,943 A * 8/1975 Braden ................ A47G 9/0284 112/475.08
4,211,010 A 7/1980 Burke et al.
4,986,005 A * 1/1991 Grippi ..................... B05C 17/06 101/127
5,319,859 A * 6/1994 Smith ................... B43L 13/205 33/566
5,557,996 A * 9/1996 Reber ..................... B26B 29/06 30/292
5,570,533 A * 11/1996 Vouyouka .............. A41H 3/002 33/12
5,577,328 A * 11/1996 Kerry, Sr. ................ G01B 3/14 33/1 G
5,579,670 A * 12/1996 McCormick .......... B26B 25/005 83/56
5,943,974 A * 8/1999 Hoag ....................... D04D 7/04 33/492
6,189,226 B1 * 2/2001 Mascarenas ........... G09B 11/04 33/563
6,216,354 B1 * 4/2001 Carbone ................. B43L 13/20 33/565
7,647,707 B2 1/2010 Manley et al.
(Continued)

FOREIGN PATENT DOCUMENTS

CN 2100754 U 4/1992
CN 2205313 Y 8/1995
(Continued)

*Primary Examiner* — George B Bennett
(74) *Attorney, Agent, or Firm* — Orin Del Vecchio

(57) ABSTRACT

Embodiments of the invention include various different shapes and sized of templates having an inner voided space or inside shape produced by a plurality of internal edges. One or more slits, sized and proportioned to accommodate a rotary cutter, are positioned at corners formed between the internal edges. The templates are particularly useful for quilters to cut quickly and easily cut the requisite patchwork pieces needed to make a quilt using a rotary cutter. The positioning and sizing of the slits resulting in minimal fabric wastage. The templates are made from a durable material, including but not limited to acrylic, plastic, wood, metal, or any other resilient material known in the art. The acrylic or plastic templates may be colored or clear.

19 Claims, 15 Drawing Sheets

(56) References Cited

U.S. PATENT DOCUMENTS

| | | | | |
|---|---|---|---|---|
| 7,854,073 | B1 * | 12/2010 | Webb | D05B 97/12 33/1 G |
| 8,186,072 | B1 * | 5/2012 | Nethery | D05B 97/12 33/565 |
| 8,261,680 | B2 * | 9/2012 | Oe | D05B 97/02 112/260 |
| 8,397,396 | B2 * | 3/2013 | Nethery | B43L 7/027 33/566 |
| 8,707,574 | B2 * | 4/2014 | Goldrick | E04F 21/26 33/563 |
| D724,966 | S * | 3/2015 | Tucker | B43L 7/027 D10/64 |
| D729,873 | S | 5/2015 | Breuker | |
| 9,067,459 | B2 * | 6/2015 | Bennet | B43L 13/002 |
| 9,624,612 | B2 * | 4/2017 | Works | D05B 97/12 |
| D785,472 | S | 5/2017 | Jack | |
| 9,962,845 | B2 * | 5/2018 | McCormick | B26B 25/005 |
| 10,526,747 | B2 | 1/2020 | Thomas et al. | |
| 10,760,206 | B1 * | 9/2020 | Carr | B43L 7/0275 |
| 11,142,866 | B2 * | 10/2021 | Rieger | B43L 7/033 |
| 11,459,681 | B2 * | 10/2022 | Mitchell | D05B 39/005 |
| 11,618,984 | B2 * | 4/2023 | McCormick | D05B 35/12 33/566 |
| 11,661,691 | B1 * | 5/2023 | Mix | B43L 13/20 33/562 |
| 11,738,591 | B2 * | 8/2023 | Ben Haim | B43L 13/001 33/563 |
| 12,049,718 | B2 * | 7/2024 | Snyder-Singer | D05B 97/12 |
| 2005/0011079 | A1 * | 1/2005 | Sikora | B25H 7/00 33/528 |
| 2005/0252019 | A1 * | 11/2005 | Gordon | B43L 13/20 33/566 |
| 2006/0191150 | A1 * | 8/2006 | Sikora | H02G 1/00 33/566 |
| 2009/0151531 | A1 * | 6/2009 | Levin | B26D 7/0006 493/37 |
| 2012/0204437 | A1 * | 8/2012 | Nethery | B43L 7/027 33/566 |
| 2013/0014681 | A1 * | 1/2013 | Kennedy | D05B 11/00 112/475.08 |
| 2015/0337469 | A1 * | 11/2015 | Bowman | D05B 97/12 33/566 |
| 2020/0298434 | A1 * | 9/2020 | Li | B26D 7/025 |
| 2023/0056505 | A1 * | 2/2023 | McCormick | D05B 35/12 |

FOREIGN PATENT DOCUMENTS

| | | |
|---|---|---|
| CN | 103404989 A | 11/2013 |
| DE | 202012000317 | 7/2012 |

* cited by examiner

FIG. 7A
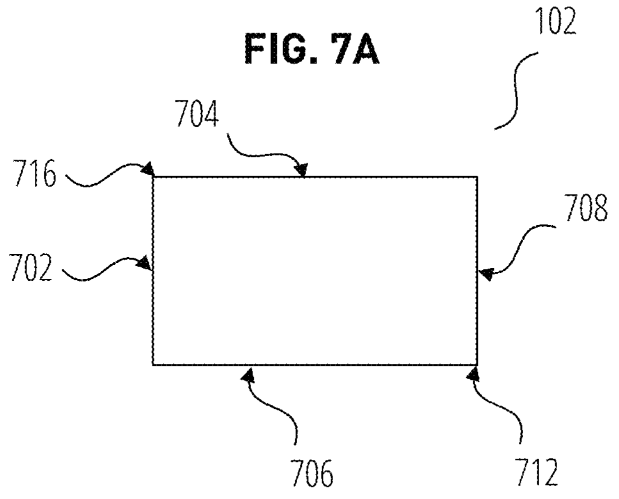
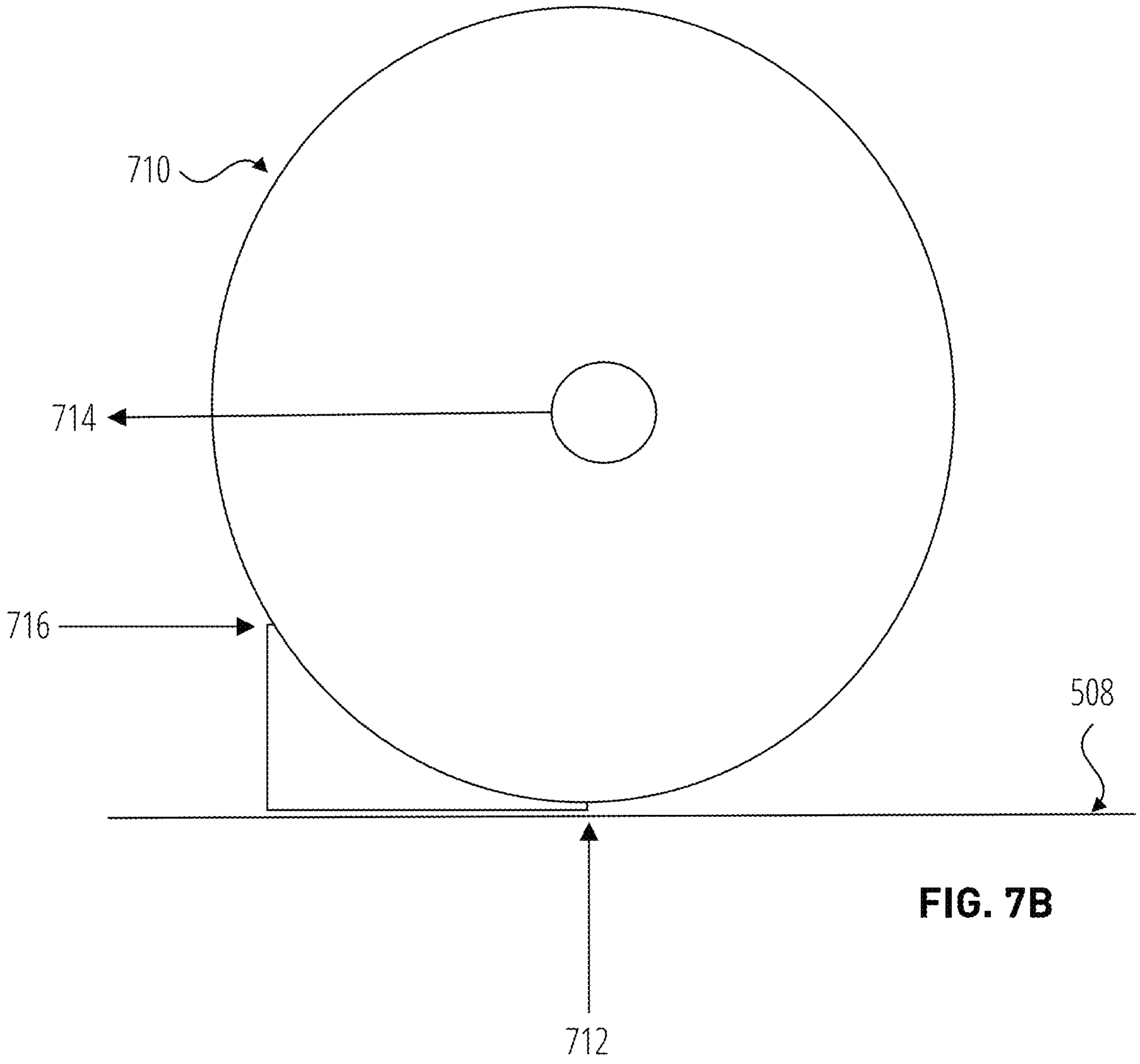
FIG. 7B

QUILTING TEMPLATES AND METHOD OF USING SAME

FIELD OF THE INVENTION

The present disclosure relates generally to a template for use with rotary cutters for cutting fabric into pieces to be assembled into quilts, more specifically, but not by way of limitation, more particularly to a fabric cutting device for precisely cutting corners and slits in fabrics or materials.

BACKGROUND

Any discussion of the related art throughout the specification should in no way be considered as an admission that such related art is widely known or forms part of common general knowledge in the field.

One of the primary techniques involved in quilt making is patchwork, which involves sewing together geometric pieces of fabric to form a design or block. The geometric pieces, designs or blocks are sewn together into a larger design. The larger design is usually based on repeating patterns built up with different fabric shapes, which are typically different colors and designs of fabric. These shapes must be carefully measured and cut in order for them to piece together accurately, and produce a finished quilt top that lies flat.

In the past, the geometric shapes were measured with a ruler, marked and cut with scissors. Modern quilting techniques have evolved into using templates, cutting boards and rotary cutters to produce the various different geometric shaped and sized pieces of fabric to be sewn into a quilt top.

Quilting templates are shapes made to outline edges for cutting the patchwork geometric pieces. Known templates are generally plastic with markings for different sizes, sewing lines or placement marks and are thick enough that they can be used with a rotary cutter. The benefits of using a quilting template for patchwork allows the pieces to be cut exactly the same size for the entire quilt top and are thick enough to be used with a rotary cutter.

Known templates, however, have several disadvantages in regards to fabric wastage.

A user currently does not have a failsafe method for cutting corners out of the fabric or material for making manual cuts using a ruler, scissors or by using a rotary cutter or other cutting tool. A quilter currently uses an existing ruler or template shape, measures and lines up the bottom and sides of the ruler or template shape to the user's desired location, draws with a marking tool along the edges of the ruler or template shape the two edges to be cut out, then the user removes the ruler or template shape and uses scissors to cut the square out of the fabric corner. This process is time consuming, and if the quilter uses a rotary cutter, can often cut past the outer edges of the ruler or template shape which results in significant fabric wastage leaving less usable fabric or material. A quilter often desires to make these types of cuts in fabric or material to make a "box corner" or cut certain measurements of fabric or material from yardage. For instance, rag quilts that require many numerous equally spaced repeated cuts into an outer each raw edge side of the fabric or material. This type of cutting can be very strenuous for the individual user to be cutting the required number of cuts through multiple layers of fabric or material. Equally spaced cuts are required to be cut along the quilt cut or raw edges so the completed quilt has a "rag" look. Numerous cuts are required to be cut and cutting these with scissors repeatedly can easily cause carpel tunnel injuries, hand and arm fatigue, and often results in overcutting some of the cuts into the seams, resulting in seam repairs, wasted fabric or material and time.

With increasing fabric and material costs, reducing the amount of fabric or material waste is paramount. Given that some quilt and bag patterns may have 200 plus pieces or more, cutting pieces for quilt and bag making patterns can take a significant amount of time for the user.

CN Pub. No. 2,100,754 U (Wei et al.) discloses a high-energy T-shaped ruler suitable for cutting clothes, comprising two straight rulers with specific obvious enlarging or diminishing scales. The two straight rulers with specific obvious enlarging or diminishing scales are fixed vertically in the T shape. The T-shaped ruler can be large and can be small. The operation needs not a calculation. One operation can accurately determine the dimension distribution positions of three parts. The utility model has the advantages of time saving, labor saving, low cost and simple manufacture. Shortcomings of this invention include wasted time or material during cutting. Once the determined measurement is lined up on the fabric/material, then the quilter/crafter may use a marking tool (pencil) and draw a line along the outside edge of the ruler and cut the shape out with scissors or will use a rotary cutter and cut along the edges of the ruler. Using a rotary cutter may often result in the quilter/crafter cutting beyond the edge of the corner of the ruler and into the remaining fabric, which results in the loss of some usable material. For the crafter/quilter using either method is time consuming and costly especially if they have several layers that are required to be cut.

CN Pub. No. 2,205,313 Y (Baoxing) discloses a multi-function garment cutting out rule for garment cutting. The cutting rule collects a plurality of cutting rules to integration, and a protractor and a slide rule are additionally arranged on the cutting rules. The utility model solves the problem of single function of the existing cutting rule. The cutting out rule of the utility model comprises two straight rules and one protractor. One end of each of the two straight rules is mutually pivoted, and the protractor is fixed on one straight rule. One end of each of the two straight rules is respectively in a straight line shape, and the other edge is respectively in a curved line shape. A long shape slotted hole is respectively arranged on the edges, and a slide mark is embedded in each slotted hole. A hair line for indicating size is labeled on a slide bar, and scales for reference dimension and calculation dimension are respectively labeled on the two straight rules. Similar to other prior art, shortcomings include waste of fabric and/or time, since the user may need to cut beyond the edge of the corner of the ruler.

CN Pub. No. 103,404,989 A (Weizhong) discloses a multifunctional ruler for costume designing, which comprises a horizontal ruler and a vertical ruler, wherein the horizontal ruler and the vertical ruler are connected through a pivot; a nested ruler is arranged on the horizontal ruler; a through groove is formed in the vertical ruler; a sliding block is arranged in the through groove; a through hole is formed in the center of the sliding block. Preferably, a large-scale mark is arranged on the horizontal ruler; a small-scale mark is arranged on the nested ruler. Through the use of the multifunctional ruler, the length can be measured, a straight line can be drawn; a zigzag circle can be drawn through matching between the sliding block and the ruler surface, and various geometric figures can be drawn when the multifunctional ruler is stuck on paper. Similar to other prior art, shortcomings include waste of fabric and/or time, since the user may need to cut beyond the edge of the corner of the ruler.

DE Pub. No. 2020/12000317 U1 (Mueseler) discloses a device for the construction of clothing cuts of any kind with the aid of the cut construction set consisting of three individual templates, which, both individually and in combination, enable a professional cut design of any kind. So that the pattern can be made on paper or similar drawing material as well as directly on the fabric to be designed. Similar to other prior art, shortcomings include waste of fabric and/or time, since the user may need to cut beyond the edge of the corner of the ruler.

U.S. Pat. No. 4,211,010 A (Burke et al.) discloses a multiple-curved fashion design tool of substantially transparent colored plastic material for fashioning and tailoring both ready-made and home-sewn clothing. Adjoining one-by-one inch grids with ⅛" divisions are formed in each major surface of the tool and are disposed thereon so as to encompass the entire periphery of the tool. Each of the unique curved and straight edge portions of the tool are especially adapted for and combine with the continuous grid to permit the tool to be readily useful in a wide range of fashioning and tailoring applications. Similar to other prior art, shortcomings include waste of fabric and/or time, since the user may need to cut beyond the edge of the corner of the ruler.

U.S. Pat. No. 7,647,707 B2 (Manley et al.) discloses a template designed to prepare various fabrics for the attachment of a decorative crocheted edge. The transparent triangular shaped template contains holes at equally spaced intervals with uniform distance from the edge of the template. The corner of the template has been designed with a radial edge for use as a pattern to cut fabric. This is done with a rotary cutter. An awl is inserted into each hole of the template piercing the fabric leaving it with exposed holes to affix the decorative crocheted edge. A marking instrument can be inserted into the holes to mark a consistent layout on the fabric for future piercing. Further, the template can be used for squaring and trimming the fabric prior to the piercing process. Shortcomings include wasted material from cutting the fabric with a rotary cutter, and/or wasted time from piercing and cutting individual sheets of fabric.

U.S. Pat. No. D729,873 S1 (Breuker) discloses a cutting template design. Shortcomings include wasted material from cutting past the dimensions of the template.

U.S. Pat. No. D785,472 S1 (Jack) discloses a sewing ruler design with curved and straight edges for the marking of a design, followed by cutting the fabric with either scissors or a rotary cutter. Similar to other prior art, shortcomings include waste of fabric and/or time, since the user may need to cut beyond the edge of the corner of the ruler.

U.S. Pat. No. 10,526,747 B2 (Thomas et al.) discloses a cutting guide having a seam allowance recess and methods of cutting a piece of material with such cutting guide. Shortcomings include shortcomings include waste of fabric and/or time, since the user may need to cut beyond the edge of the corner of the ruler.

U.S. Pat. No. 10,760,206 B1 (Carr) discloses a device incorporating visible alignment features which allow the precision trimming of fabric into geometric shapes of a fixed size is disclosed. The device also allows trimming of fabric figures composed of simpler geometric shapes, including guides for rotary trimmers or other cutting implements to remove excess fabric at the seam created by the most common method of creating such figures, to produce figures of specified size and shape with no measuring required. The device incorporates a plurality of trimming slits and indexing indicators allowing it to be used to produce such figures. A method of using the device to produce multiple final fabric pieces from a single section of base fabric is also disclosed. Shortcomings include waste of fabric and/or time, since the user may need to cut beyond the edge of the corner of the ruler.

All documents cited herein are incorporated by reference.

It is clear that there exists a need for a fabric cutting device for precisely cutting patchwork pieces of fabric, including corners and slits in fabrics and materials. There is need for a fabric cutting device that allows a user to precisely cut corners, outlines and shapes in fabrics that reduces fabric and materials waste, reduces effort and increases efficiency.

BRIEF SUMMARY

It is an object of the present invention to provide quilting templates and methods of using same.

In accordance with one aspect of the invention there is provided a fabric cutting template for precisely cutting and measuring one or more fabrics using a rotary cutter, said template comprising a planar body having a plurality of cutting edges and one or more slits extending into the template from one or more of the plurality of the cutting edges, wherein the one or more slits have a width that can accommodate a width of the rotary cutter and a predetermined length that extends into the template to a distance that determines a stop point for the precise cutting.

In accordance with another aspect of the invention there is provided a kit for precisely cutting and measuring one or more fabrics, comprising, in combination one or more for the templates and a set of instructions for applying the templates to the one or more fabrics.

In accordance with an embodiment of the invention, the template is composed of transparent material.

In accordance with an embodiment of the invention, the transparent material is acrylic or colored acrylic.

In accordance with an embodiment of the invention, the one or more of the plurality of cutting edges, that are connected to the one or more slits, are an inner edge or inner edges of the template.

In accordance with an embodiment of the invention, the one or more slits are connected to an intersection of two of the plurality of cutting edges.

In accordance with an embodiment of the invention, the edge connected to the one or more slits is an outer edge.

In accordance with an embodiment of the invention, the one or more slits are formed from straight lines.

In accordance with an embodiment of the invention, the one or more slits are formed from curved lines.

In accordance with an embodiment of the invention, the body is marked with measurement increment.

In accordance with an embodiment of the invention, the body is marked with dimensions.

In accordance with an embodiment of the invention, the body is marked with angles.

In accordance with an embodiment of the invention, the body is marked with cutting instructions.

In accordance with an embodiment of the invention, the body contains a hole for coupling to a storage apparatus.

In accordance with an embodiment of the invention, the template is applied on top of more than one layer of said fabric.

In accordance with an embodiment of the invention, the slits are equally spaced apart.

In accordance with an embodiment of the invention, the one or more slits lengths are different sizes to accommodate different sized rotary cutters.

In accordance with an embodiment of the invention, the one or more slits widths are different sizes to accommodate different sized rotary cutters.

In accordance with an embodiment of the invention, the one or more templates are different sized and shaped templates that, when arranged in specific order, produce a specific pattern.

BRIEF DESCRIPTION OF THE DRAWINGS

To easily identify the discussion of any particular element or act, the most significant digit or digits in a reference number refer to the figure number in which that element is first introduced.

In the figures, embodiments are illustrated by way of example. It is to be expressly understood that the description and figures are only for the purpose of illustration and as an aid to understanding.

Figure 1A:
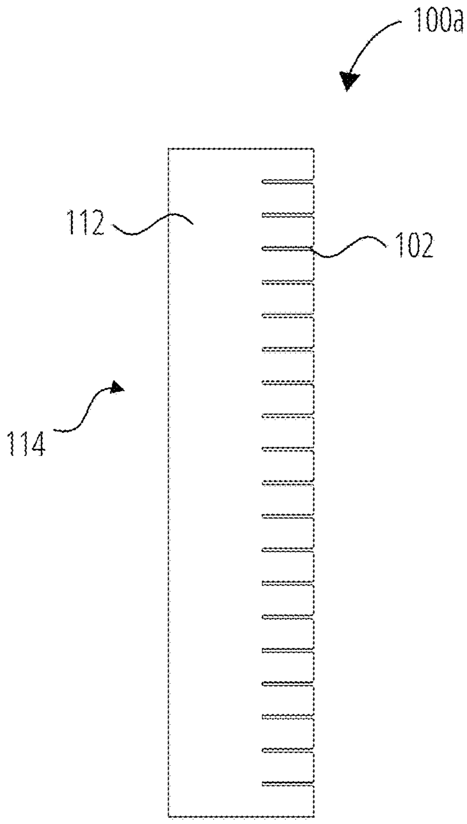

Embodiments will now be described, by way of example only, with reference to the attached figures, wherein the figures:

FIG. 1A illustrates a top view 100*a* of a single-sided rag quilting template 114 fabric cutting device in accordance with one embodiment.

Figure 1B:
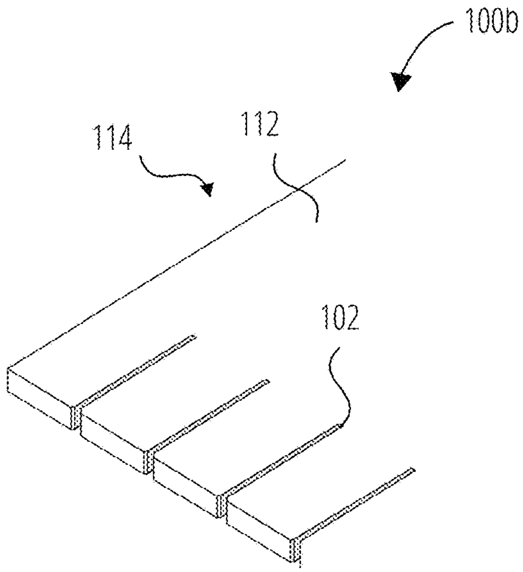

FIG. 1B illustrates a perspective view 100*b* of a single-sided rag quilting template 114 fabric cutting device in accordance with one embodiment.

Figure 1C:
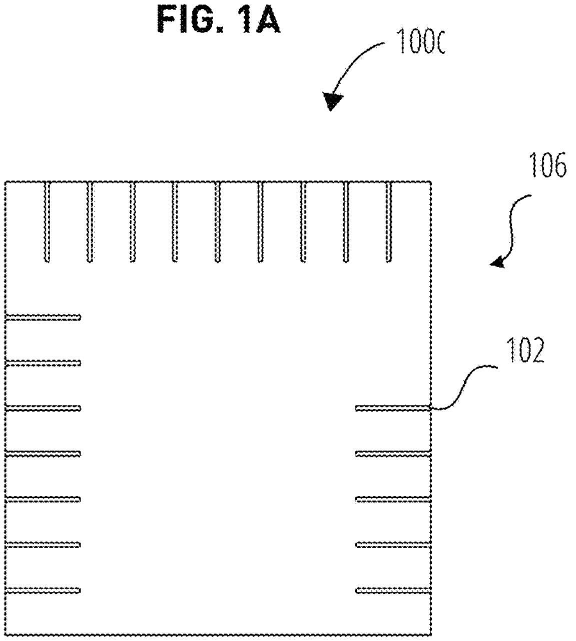

FIG. 1C illustrates a sectional top view 100*c* of a multi-sided rag quilting template 106 fabric cutting device in accordance with one embodiment.

Figure 1D:
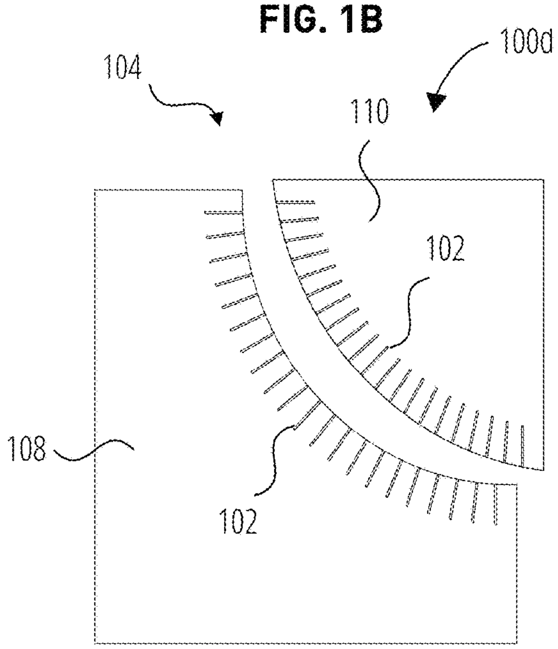

FIG. 1D illustrates a sectional top view 100*d* of a combination curved rag quilting template 104 fabric cutting device in accordance with one embodiment.

Figure 2A:
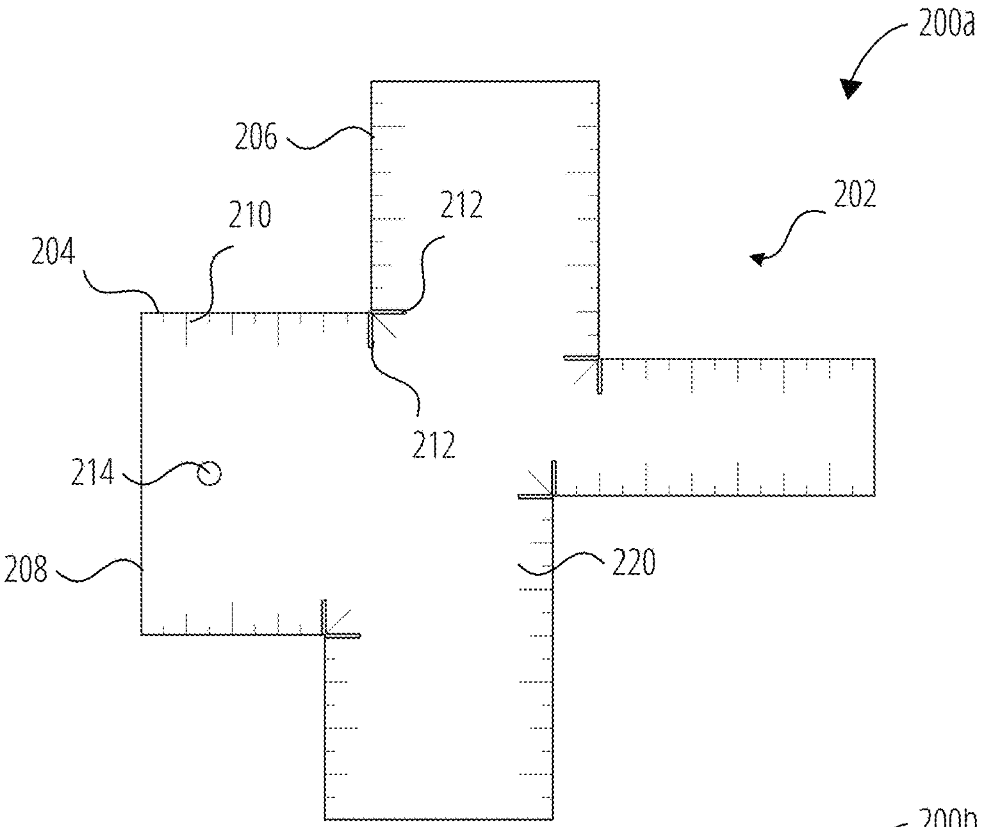

FIG. 2A illustrates a top view 200*a* of a multi-irregular-sided combination measuring and corner cutting template 202 fabric cutting device in accordance with one embodiment.

Figure 2B:
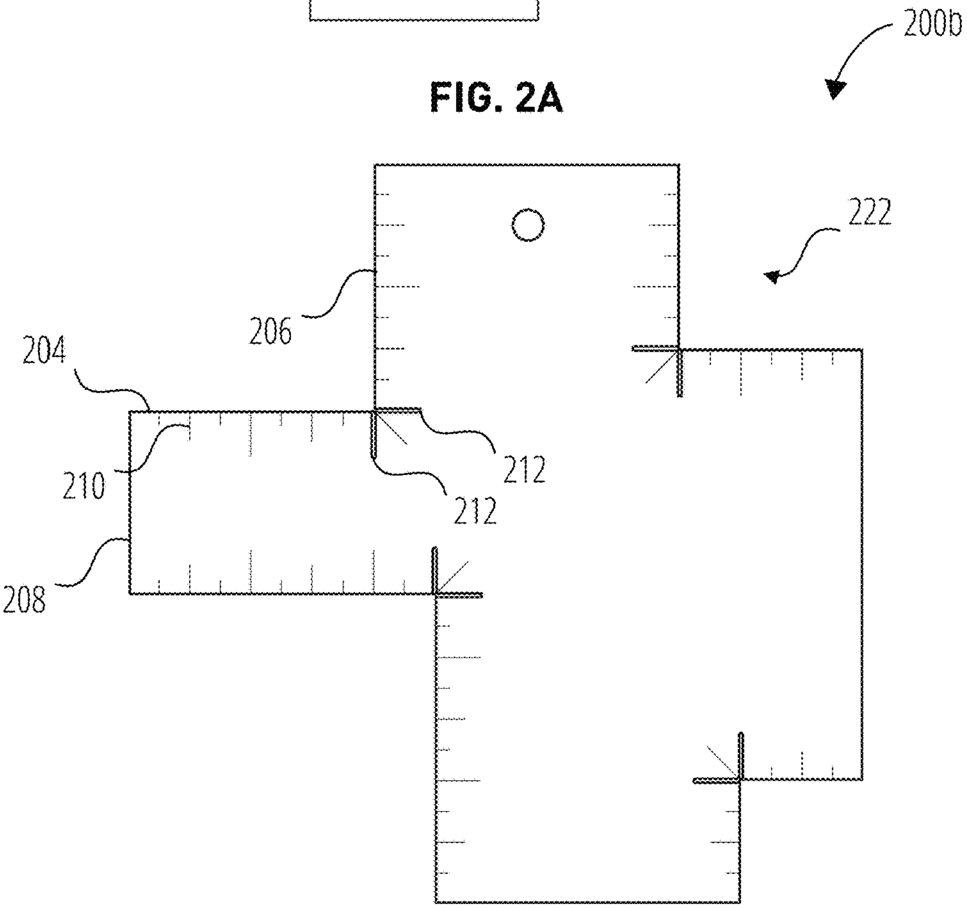

FIG. 2B illustrates a top view 200*b* of a multi-irregular-sided combination measuring and corner cutting template 222 fabric cutting device in accordance with one embodiment.

Figure 2C:
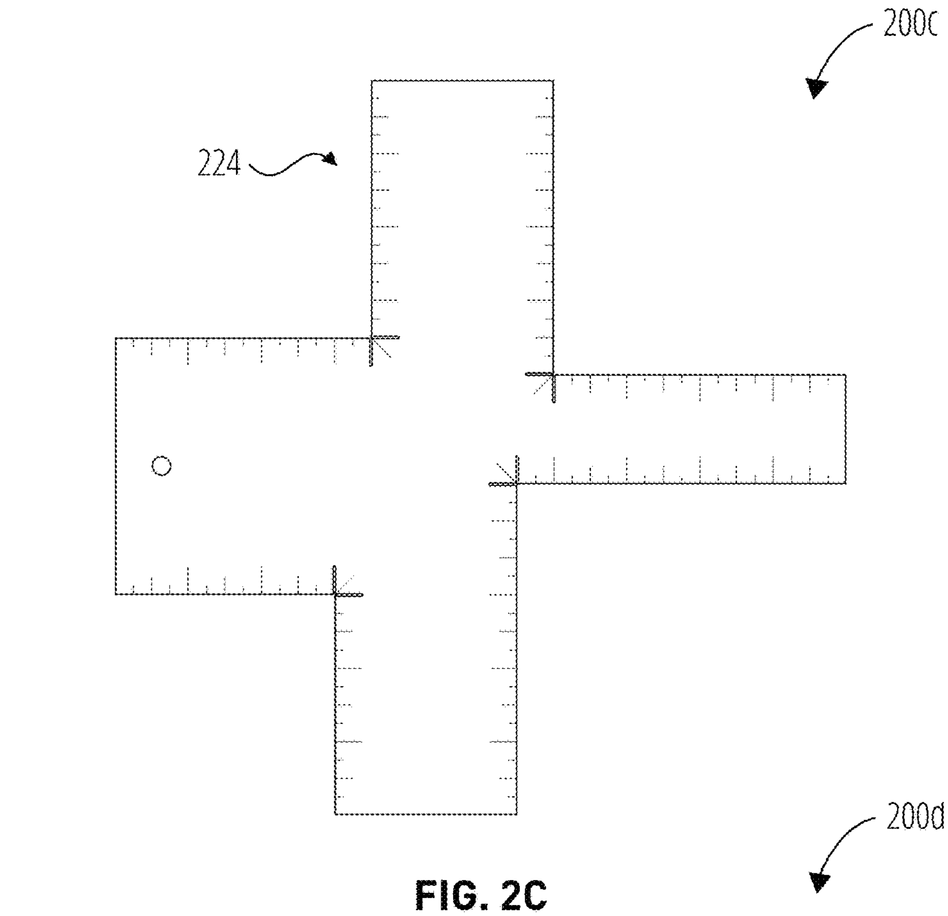

FIG. 2C illustrates a top view 200*a* of a multi-irregular-sided combination measuring and corner cutting template 224 fabric cutting device in accordance with one embodiment.

Figure 2D:
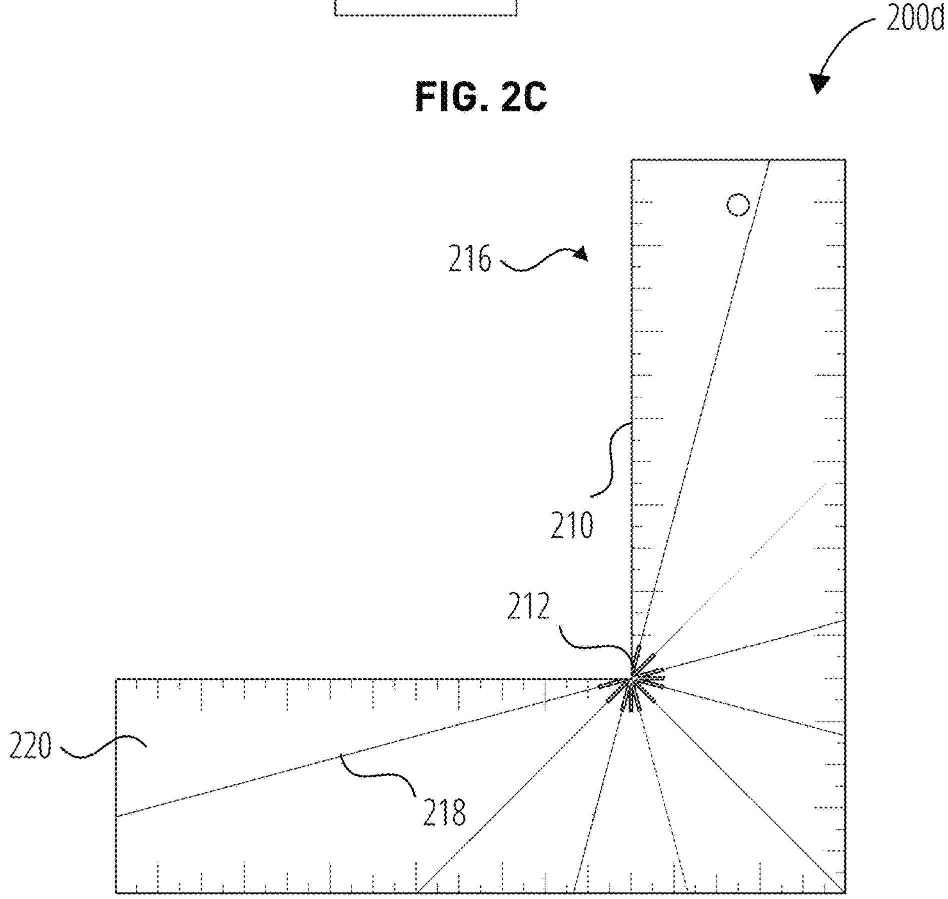

FIG. 2D illustrates a top view 200*a* of an L-shaped combination measuring and corner cutting template 216 fabric cutting device in accordance with one embodiment.

Figure 3A:
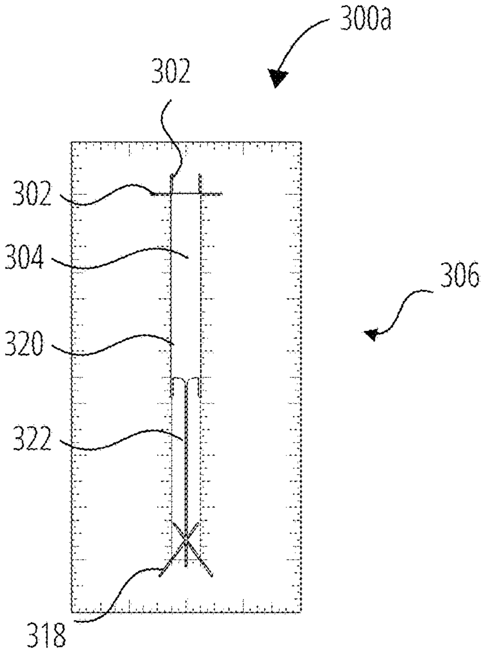

FIG. 3A illustrates a top view 300*a* of a single end zipper template 306 fabric cutting device in accordance with one embodiment.

Figure 3B:
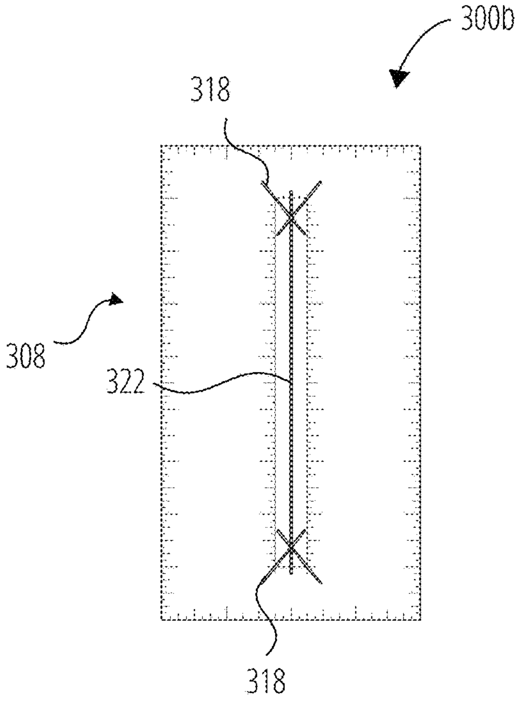

FIG. 3B illustrates a top view 300*b* of a double end zipper template 308 fabric cutting device in accordance with one embodiment.

Figure 3C:
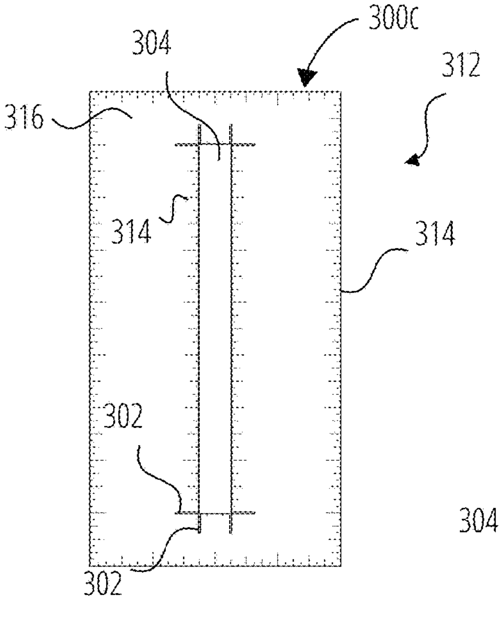

FIG. 3C illustrates a top view 300*c* of a single zipper template 312 fabric cutting device in accordance with one embodiment.

Figure 3D:
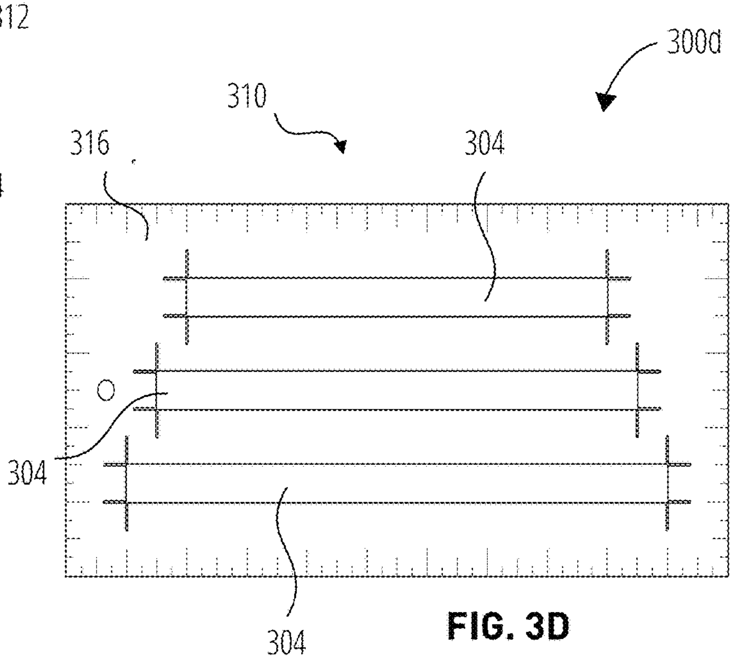

FIG. 3D illustrates a top view 300*d* of a multi-sized zipper template 310 fabric cutting device in accordance with one embodiment.

Figure 4A:
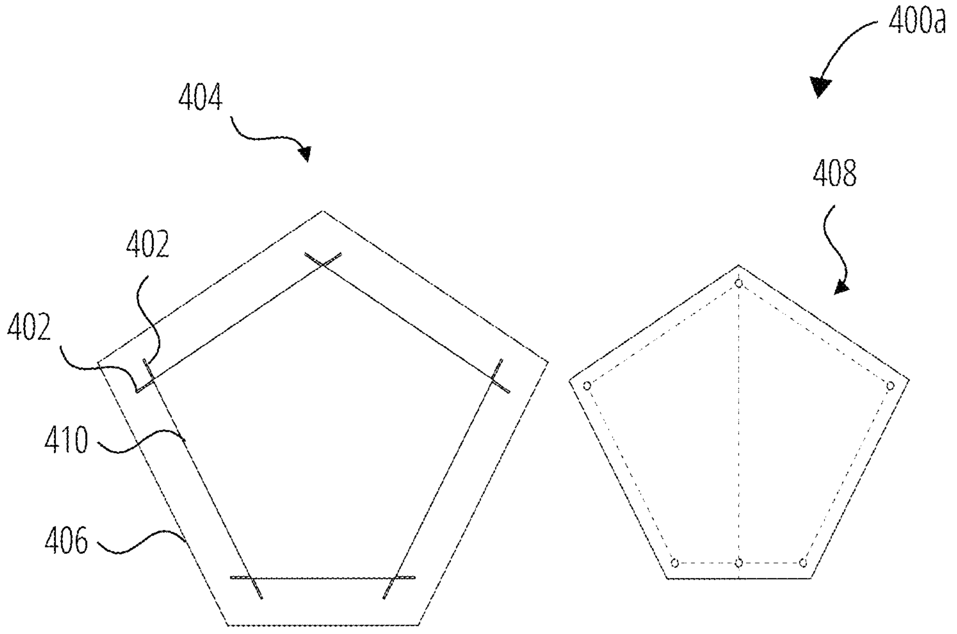

FIG. 4A illustrates a top view 400*a* of a pentagon shaped corner cutting template 404 fabric cutting device in accordance with one embodiment.

Figure 4B:
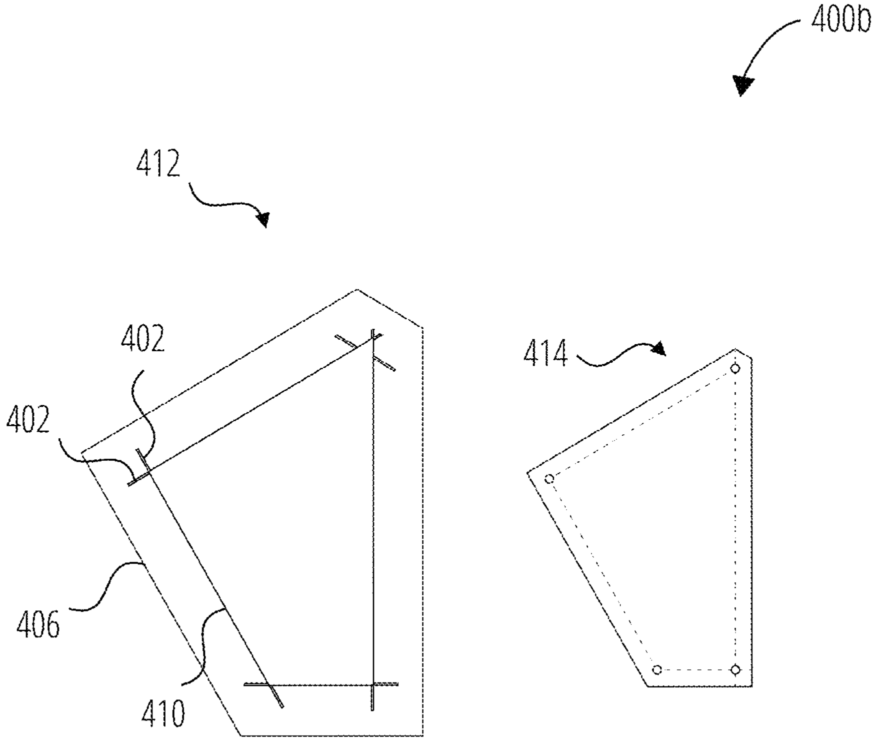

FIG. 4B illustrates a top view 400*b* of an irregular rectangle shape corner cutting template 412 fabric cutting device in accordance with one embodiment.

Figure 4C:
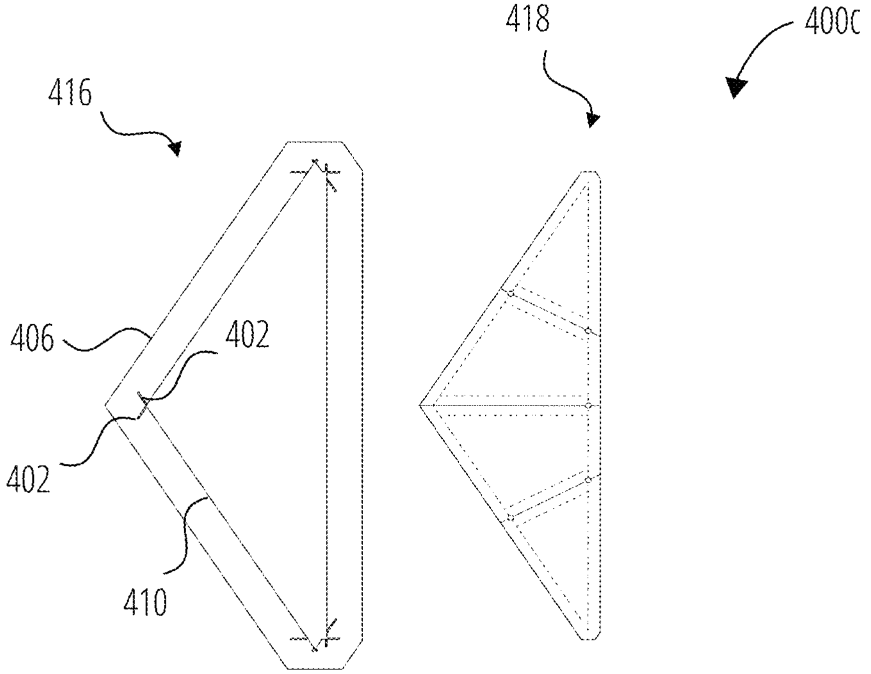

FIG. 4C illustrates a top view 400*c* of an isosceles triangle shaped corner cutting template 416 fabric cutting device in accordance with one embodiment.

Figure 4D:
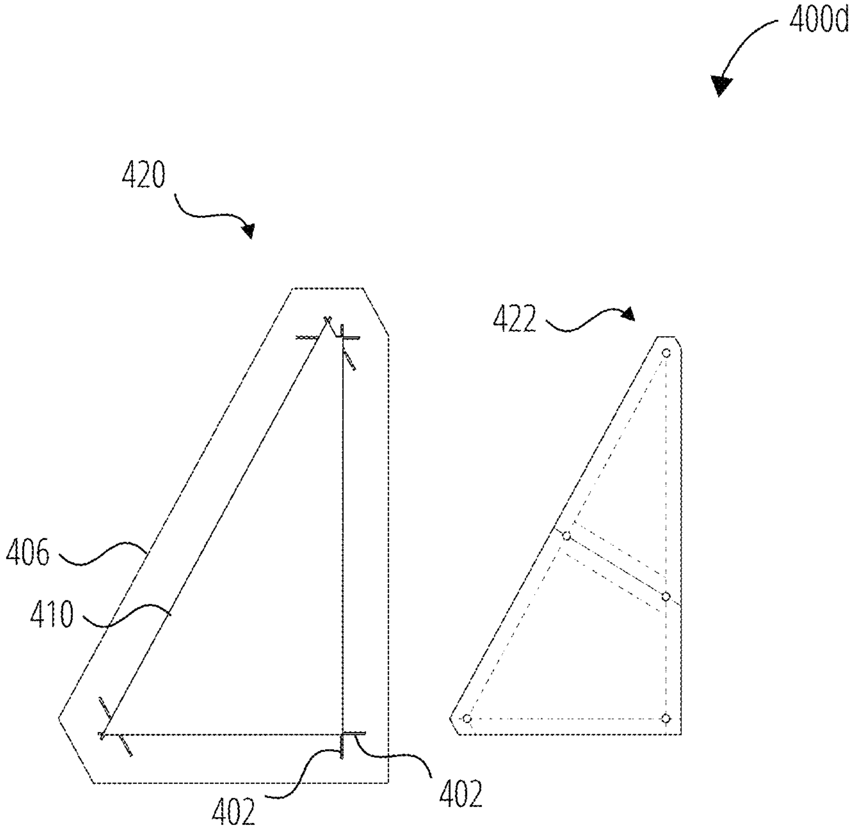

FIG. 4D illustrates a top view 400*d* of a right-angle triangle shaped corner cutting template 420 fabric cutting device in accordance with one embodiment.

Figure 4E:
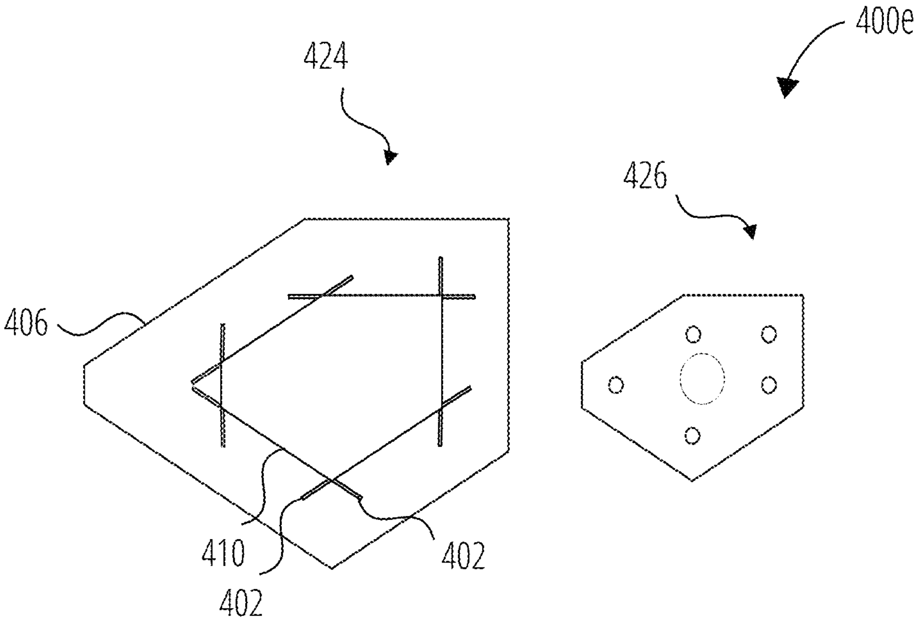

FIG. 4E illustrates a top view 400*e* of an irregular pentagon shaped corner cutting template 424 fabric cutting device in accordance with one embodiment.

Figure 4F:
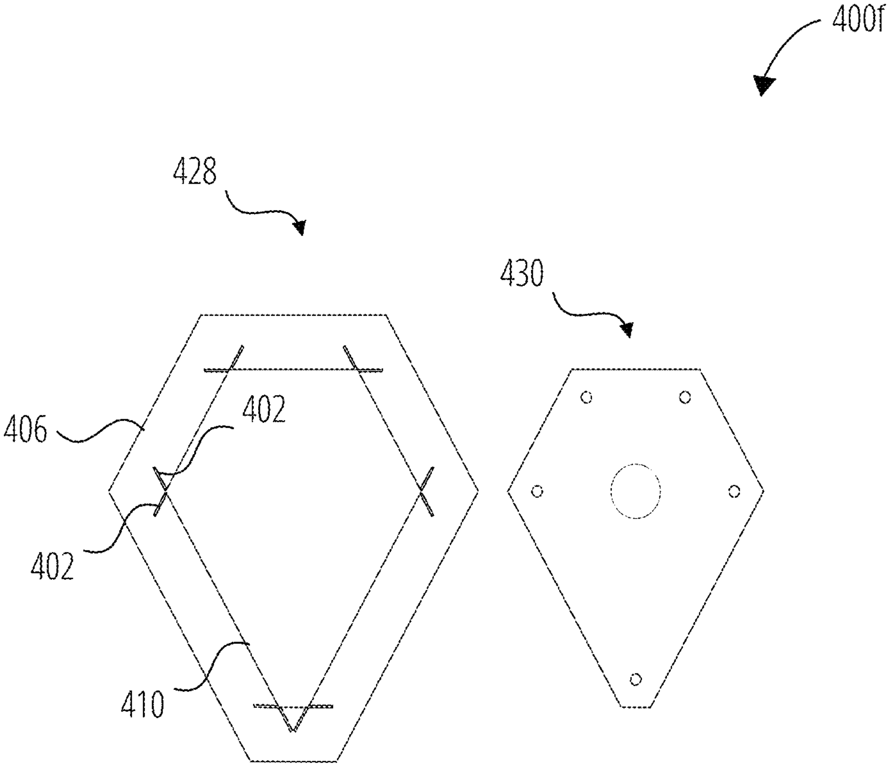

FIG. 4F illustrates a top view 400*f* of a coffin shaped corner cutting template 428 fabric cutting device in accordance with one embodiment.

Figure 4G:
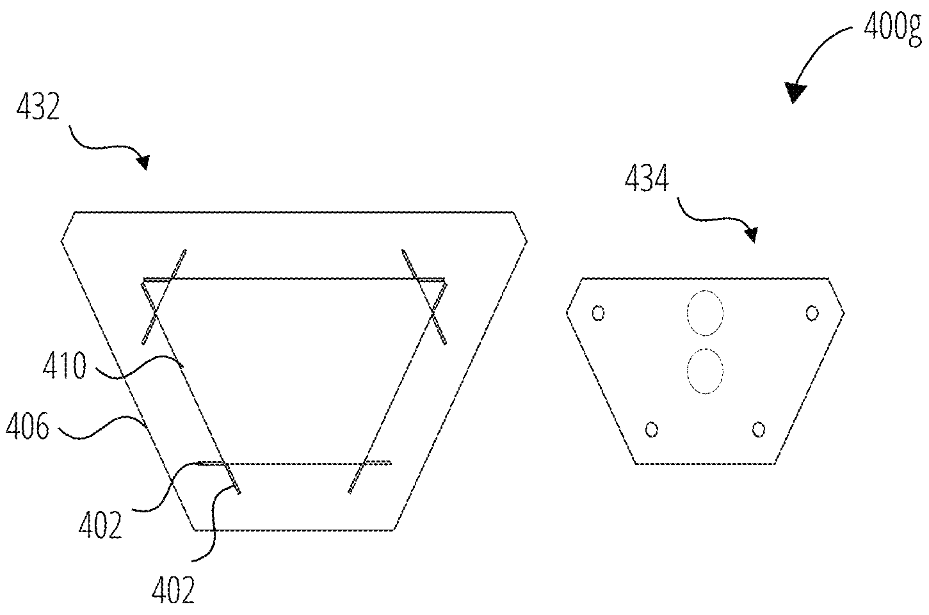

FIG. 4G illustrates a top view 400*g* of a trapezoid shaped corner cutting template 432 fabric cutting device in accordance with one embodiment.

Figure 4H:
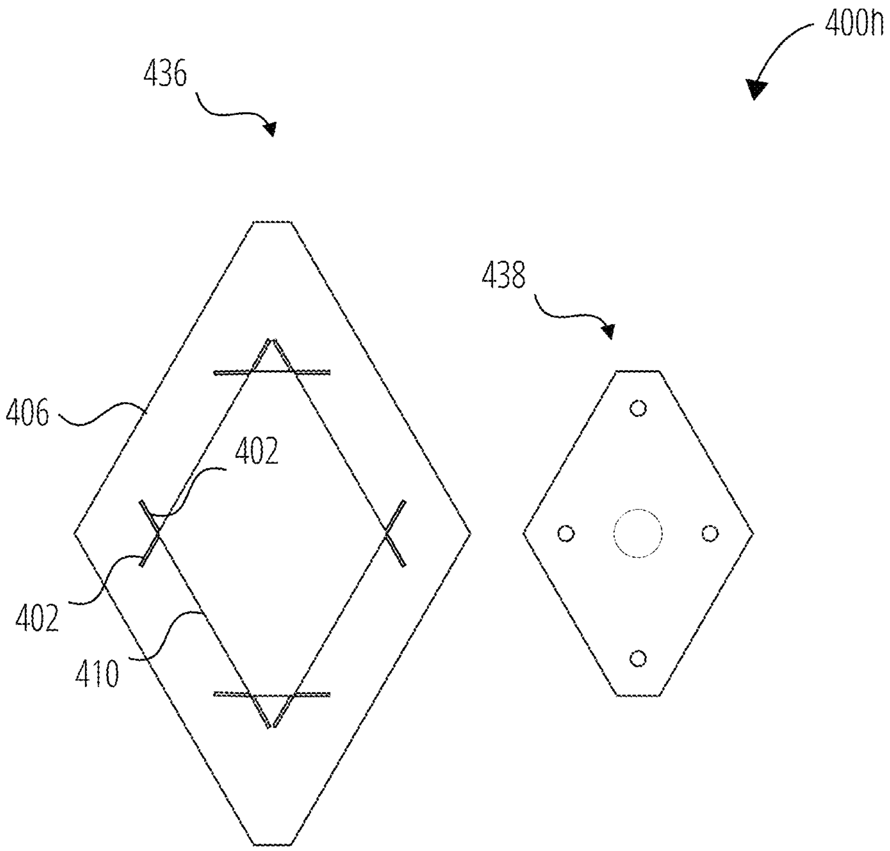

FIG. 4H illustrates a top view 400*h* of a diamond shaped corner cutting template 436 fabric cutting device in accordance with one embodiment.

Figure 4I:
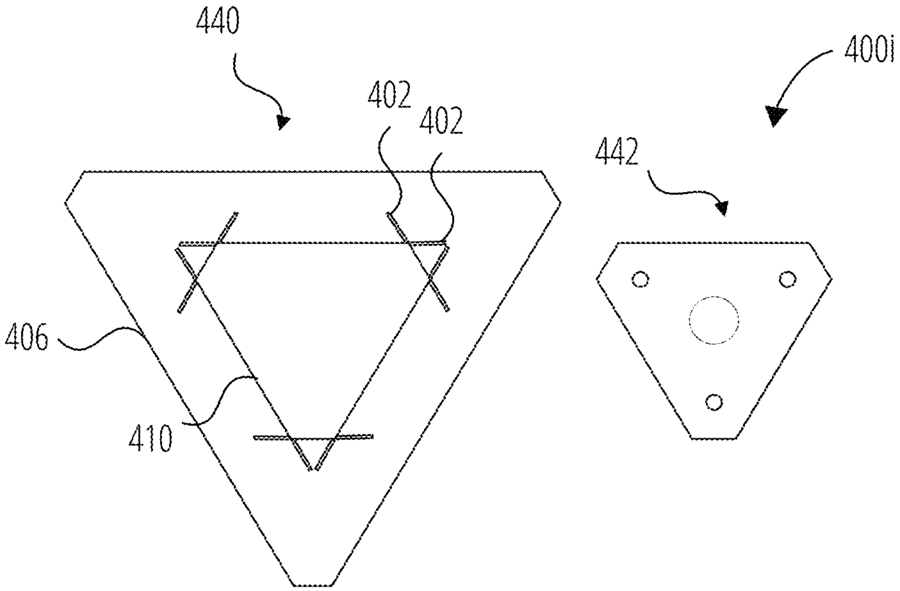

FIG. 4I illustrates a top view 400*i* of an equilateral triangle shaped corner cutting template 440 fabric cutting device in accordance with one embodiment.

Figure 5A:
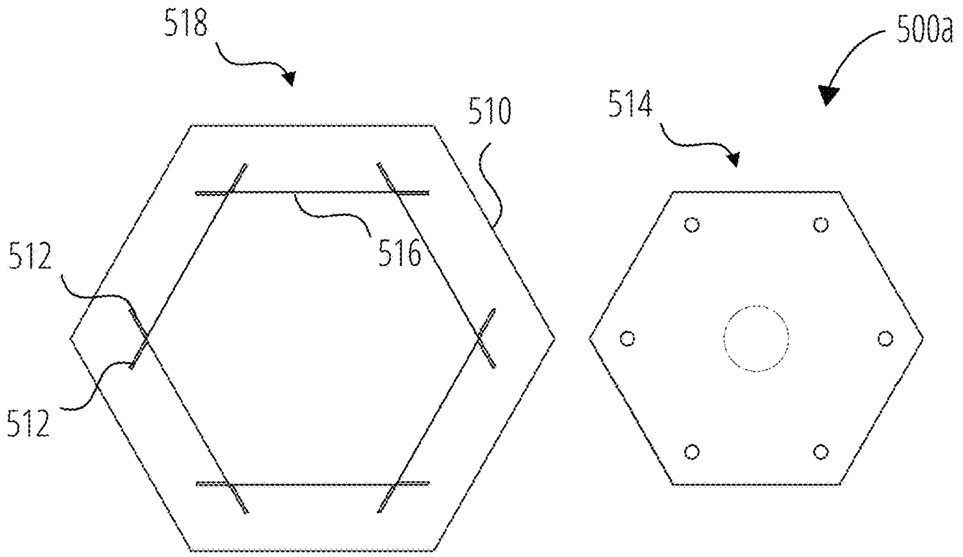

FIG. 5A illustrates a top view 500*a* of a hexagon shaped corner cutting template 518 fabric cutting device in accordance with one embodiment.

Figure 5B:
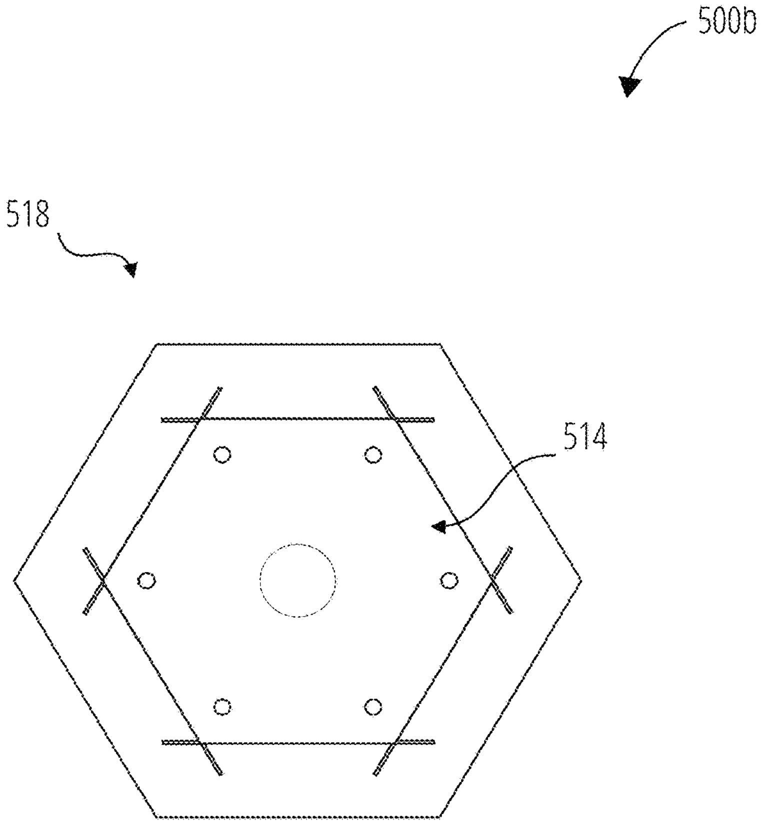

FIG. 5B illustrates a top view 500*b* of a hexagon shaped corner cutting template 518 fabric cutting device in accordance with one embodiment.

Figure 5C:
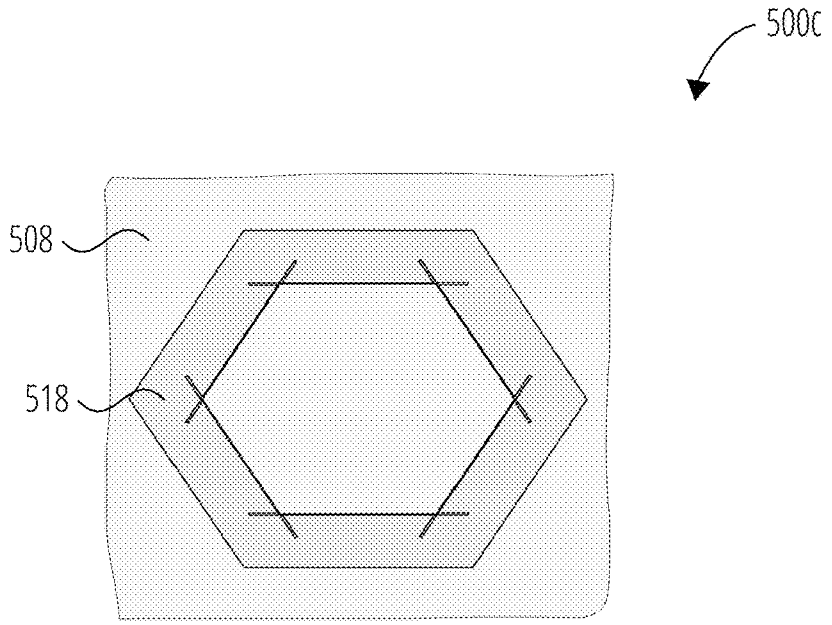

FIG. 5C illustrates a top view 500*c* of a hexagon shaped corner cutting template 518 fabric cutting device with a fabric 508 in accordance with one embodiment.

Figure 5D:
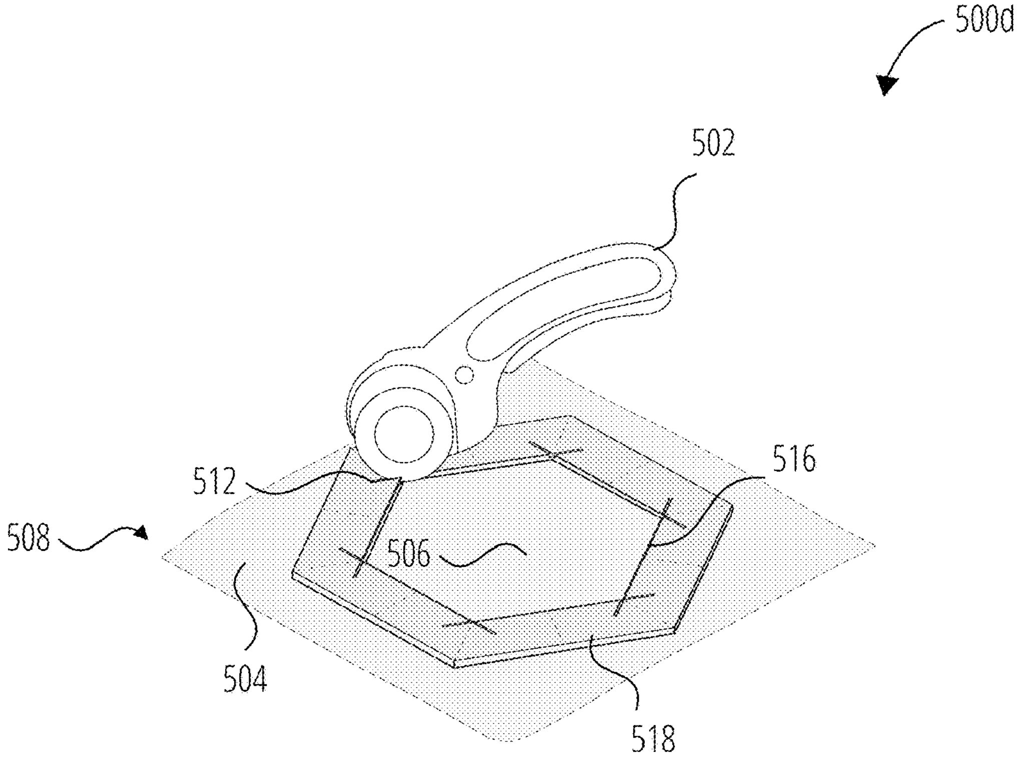

FIG. 5D illustrates a perspective view 500*d* of a hexagon shaped corner cutting template 518 fabric cutting device with a fabric 508 and a fabric cutting device 502 in accordance with one embodiment.

Figure 5E:
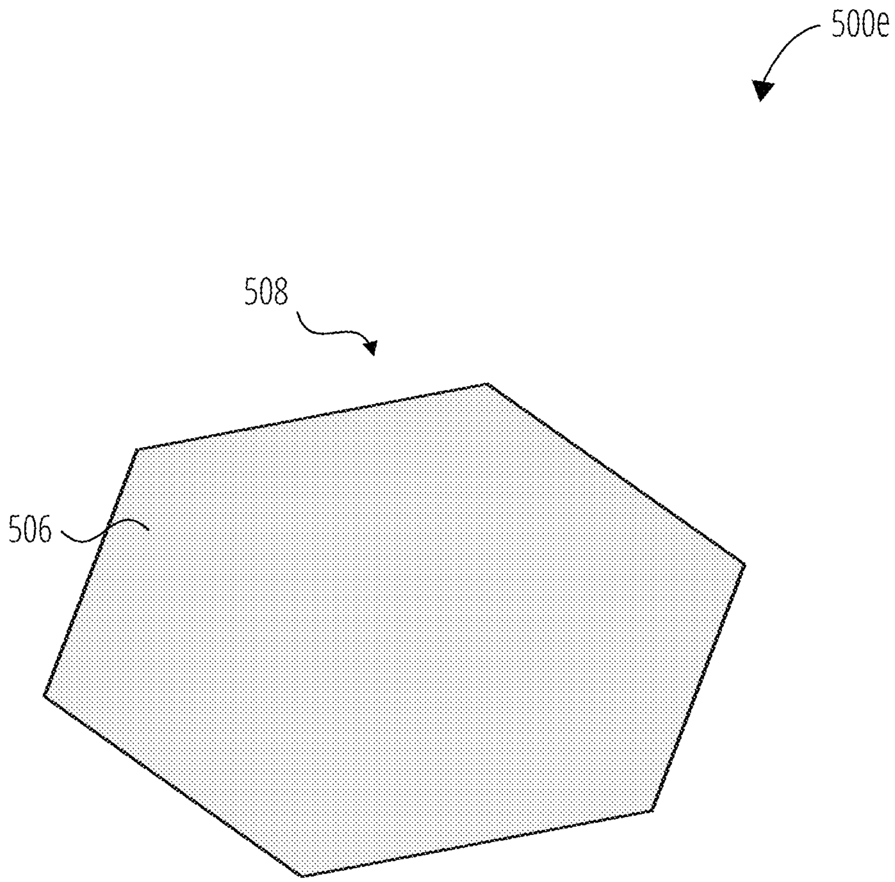

FIG. 5E illustrates a perspective view 500*e* of a fabric 508 in accordance with one embodiment.

Figure 6A:
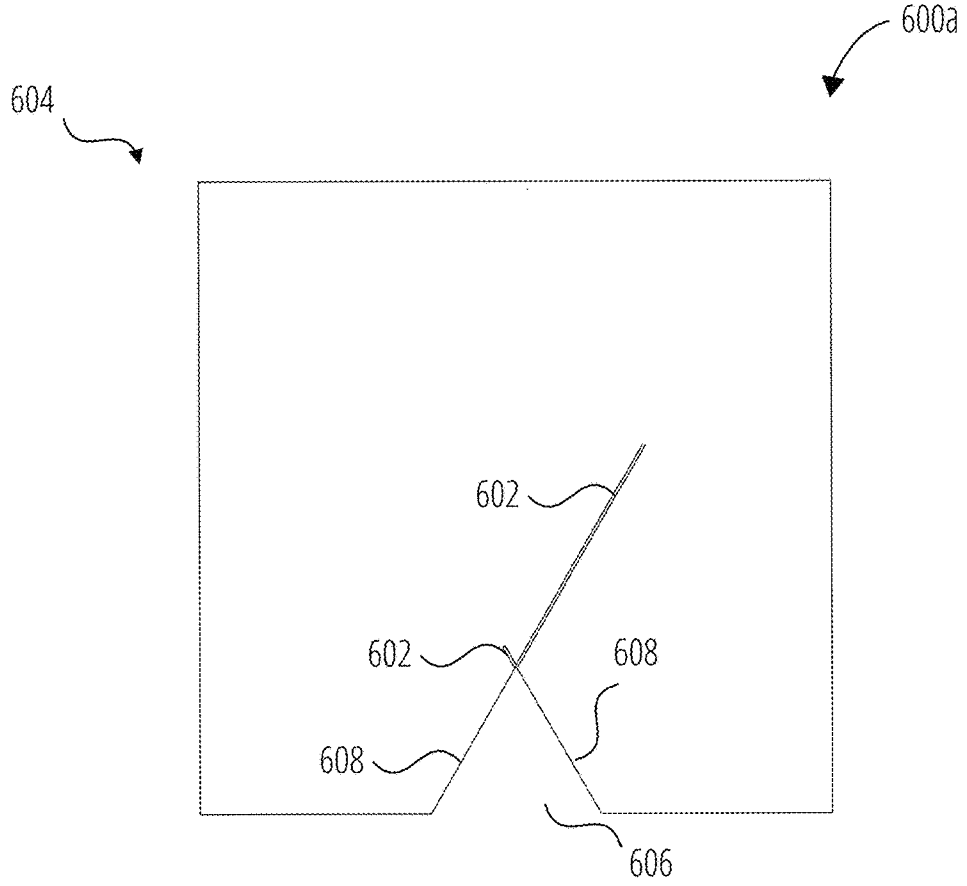

FIG. 6A illustrates an aspect of the subject matter in accordance with one embodiment.

Figure 6B:
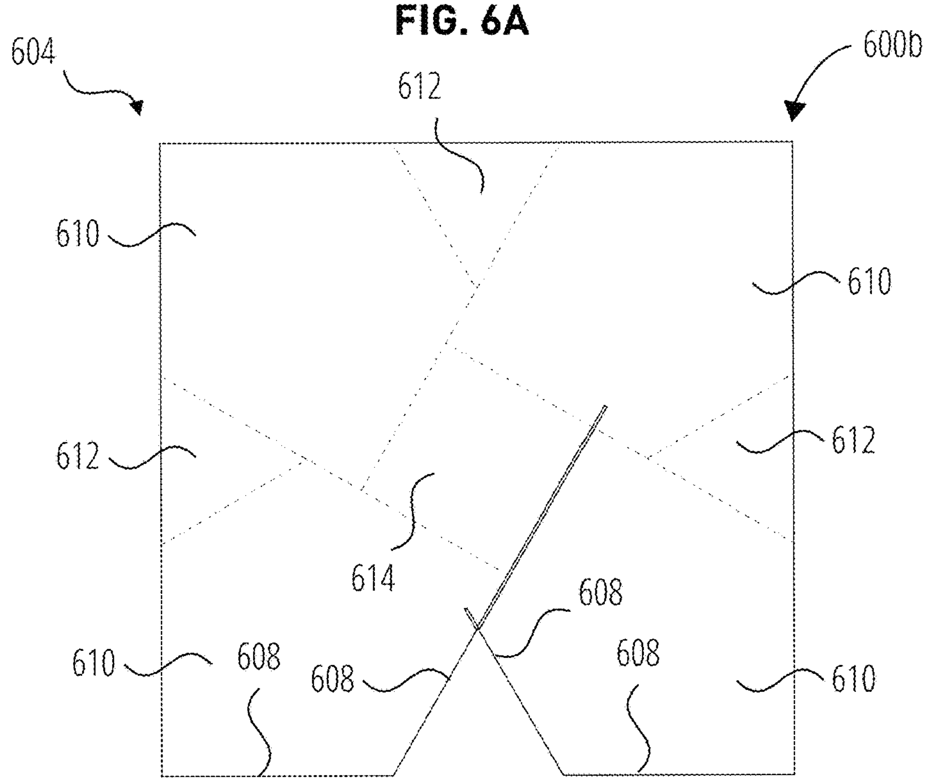

FIG. 6B illustrates an aspect of the subject matter in accordance with one embodiment.

FIG. 7A shows a side cross-sectional view of a slit in accordance with one embodiment of the invention.

FIG. 7B shows a side cross-sectional view of a slit in accordance with one embodiment of the invention.

Figure 8A:
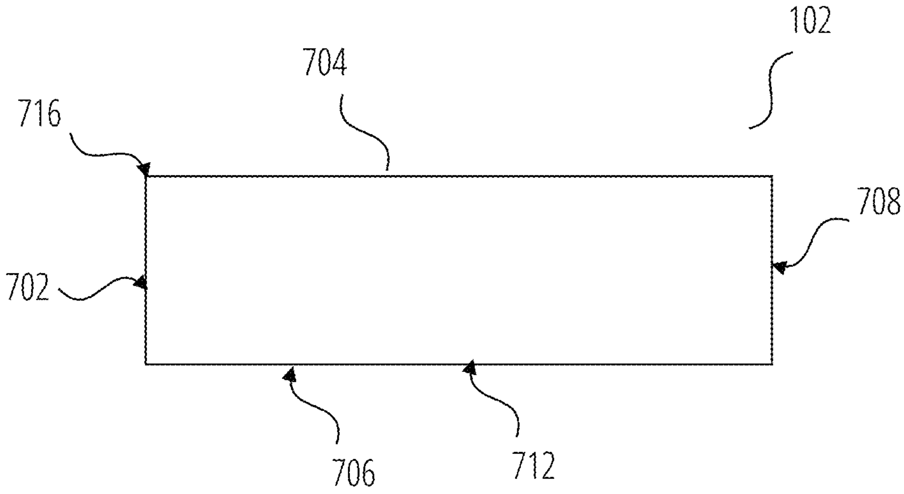

FIG. 8A shows a side cross-sectional view of a slit in accordance with one embodiment of the invention.

Figure 8B:
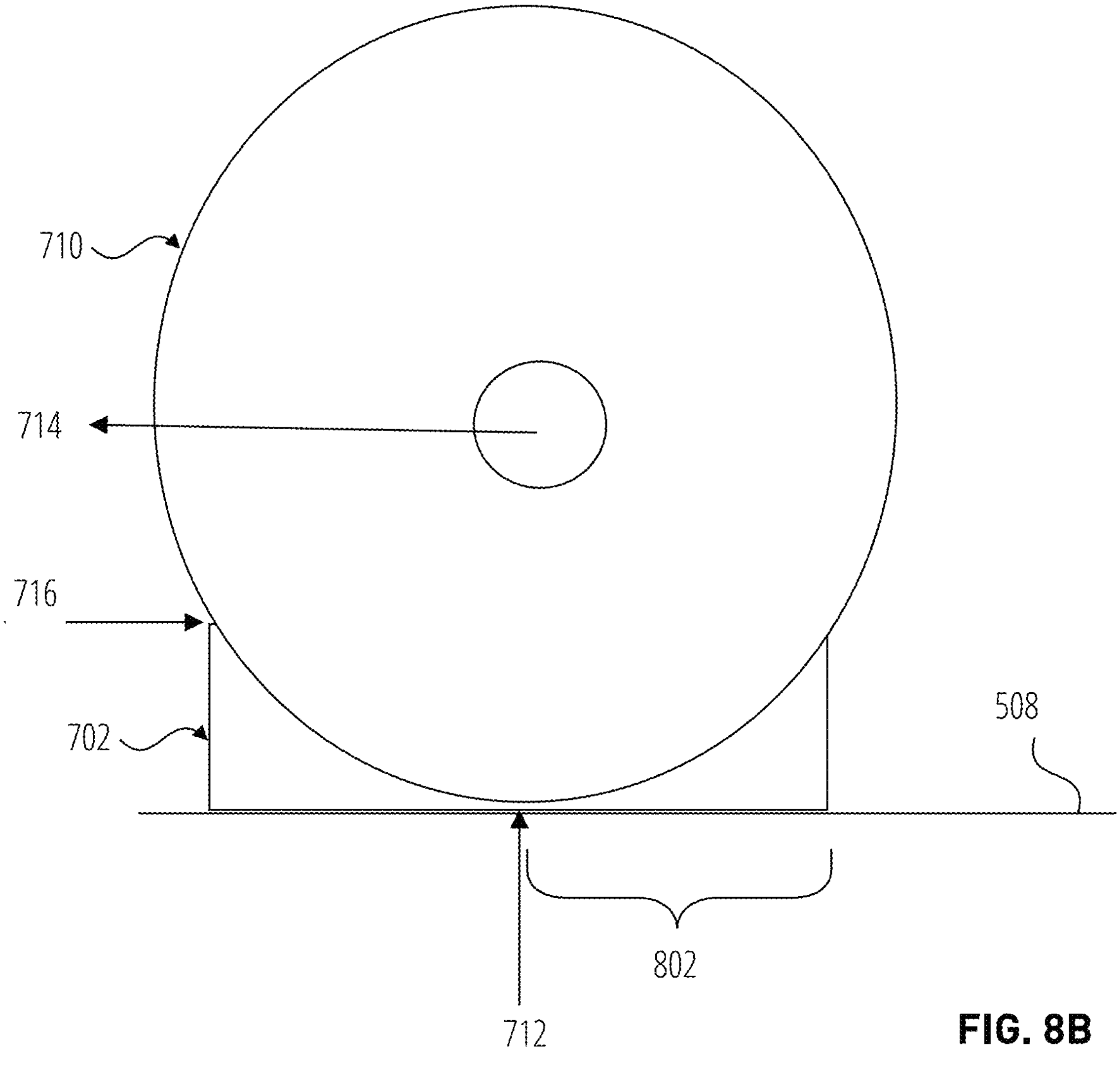

FIG. 8B shows a side cross-sectional view of a slit in accordance with one embodiment of the invention.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Embodiments of the invention disclosed herein relate to a fabric and material measuring and cutting device for precisely measuring and shapes from fabrics and materials and for cutting corners in fabrics and materials.

Embodiments of the invention may include a template having an inner voided space or inside shape produced by a plurality of internal edges. The quilter cuts along the internal edges using a rotary cutter to produce a patchwork piece that reflects the inner voided space or inside shape. The templates are made from a durable material, including but not limited to acrylic, plastic, wood, metal, or any other resilient material known in the art. The acrylic of plastic templates may be colored or clear. The templates may be of any thickness. The cuts or slits extend slightly past the intersection of the internal edges and terminate in an end. The cuts or slits thereby allow the upper edge of the rotary cutter to extend slightly past the intersection of the internal edges and stop at the end of the cut or slit. This results in the lower cutting surface of the rotary cutter stopping at exactly the point where the internal edges intersect. Hence the combination of a cutting template with an inner voided space having cuts of slits at the intersection corners of the internal edges results in the quilter being able to use a rotary cutter to cut patchwork pieces from fabric or material without cutting beyond the desired point, resulting in little or no wastage of fabric or material and time.

Like reference numbers and designations in the various drawings indicate like elements.

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

The present invention provides a fabric or material design template that may be formed into many different embodiments. As such, the general purpose of the present invention, which will be described subsequently in greater detail, is to provide a new and improved fabric and material measuring and cutting device for precisely measuring and cutting corners and slits in fabrics and materials, which provides the advantages and overcomes the aforementioned disadvantages.

The fabric cutting template contains a flat, typically transparent body having at least two outer edges one or more cutting slits connected to at least one of the edges.

FIG. 1A illustrates a top view 100*a* of a single-sided rag quilting template 114, according to an embodiment of the invention. In this embodiment, a single-sided rag quilting template 114 is shown including a plurality of slits 102 along an outer edge of the body 112 of the single-sided rag quilting template 114.

When employing the single-sided rag quilting template 114, the rag quilting template 104 preferably comprises one or more slits 102 which extend to or slightly past the desired seamline of a material, and are equally spaced apart. The single-sided rag quilting template 114 may be used to guide multiple straight cuts through one or more pieces of fabric and materials, without the need for cutting with scissors or another cutting device, prior to sewing the fabric or material. Traditionally the cutting of the material or fabric with cuts an equal distance apart can be tricky after the quilt is sewn. Once a quilt is sewn with all the layers of fabric and material (usually flannel which is thicker than cotton) it is difficult to cut with scissors. Lots of users, have arthritis, and struggle with cutting through a few layers. The cutting process can make the user's hand and arm sore from the repeated action.

The single-sided rag quilting template 114 allows the user to use a cutting device, such as a rotary cutter to cut through one or more layers of fabric and material at a time easily prior to sewing. The user can easily see the cuts in the fabric and material prior to sewing, which eliminates the unfortunate event of cutting through any seams. The single-sided rag quilting template 114 can be used for standard sizes of fabric and material and they may be composed of a durable material may preferably, but need not necessarily, acrylic (any thickness or color), wood, or metal.

FIG. 1B illustrates a perspective view 100*b* of a single-sided rag quilting template 114 fabric cutting device, according to some embodiments. The slit 102 may be seen in FIG. 1B to have a depth that is equal to the thickness of the body of the single-sided rag quilting template 114, such that while a cutting device is being applied to the single-sided rag quilting template 114 on top of a fabric, the lower surface of the cutting device cuts through the exposed portion of the fabric or materials and ceases cutting the fabric or material at a predetermined point, part-way along the slit, when the end of the slot 102 meets an outer surface of the cutting device. In some embodiments, the length of the rag slits 102 can also be lengthened or shortened by adjusting the placement of the template, the single-sided rag quilting template 114 for example, on the fabric.

FIG. 1C illustrates a top view 100*c* of a multi-sided rag quilting template 106 fabric cutting device according to some embodiments. In the embodiment shown, the multi-sided rag quilting template 106 contains four sides, similar to the single-sided rag quilting template 114, but differs in the multiple sets of slits 102 along multiple outer edges of a template. Each of the slits 102 shown are formed from straight lines.

The multiple sets of slits 102 along the three sides are equivalent in length and width. The different set of slits 102 on the are for lining up and cutting a 3" (side with 5 slits 102), 4" (side with 7 slits 102) and 5" (side with 9 slits 102). The multi-sided rag quilting template 106 is utilized for 5", 4" and or 3" precut squares.

FIG. 1D illustrates a top view 100*d* of a combination curved rag quilting template 104 fabric cutting device according to some embodiments. The first piece 108 is shown comprising a plurality of slits 102 along a curved outer edge. Likewise, the second piece 110 is shown comprising a plurality of slits 102 along a curved outer edge. The slits 102, first piece 108 and the second piece 110 can be combined to form a uniform shape, which is a square in this embodiment, where the slits 102 from the first piece 108 align with the slits 102 from the second piece 110.

The outer curved edge of the second piece 110 is overlayed on top of the first piece 108. The ends of the slits on the second piece 110 and the first piece 108 are aligned and sewn along a line where the slits end.

FIG. 2A illustrates a top view 200*a* of a multi-irregular-sided combination measuring and corner cutting template 202 according to additional embodiments. In the embodiment shown, the multi-irregular-sided combination measuring and corner cutting template 202 has in each corner two sides of an equal square that when removed results in four uniquely shaped squares. This particular template is useful in cutting the required pre measured squares in fabric or material, allowing the rotary cutter to not cut into the corners of fabric or material yardage, creating box corners when making bags and clutch purses.

Each uniquely sized square shown contains a first side 204, a second side 206 and a third side 208 with measuring increments 210 along the exterior of one or more of the first side 204, the second side 206 and the third side 208 for measuring lengths of fabric or material. For example, the template illustrated has 2", 2.5", 3" and 3.5" edges of the sides of the squares (shown as first side 204, a second side 206). The measuring increments 210 may be employed such that the multi-irregular-sided combination measuring and corner cutting template 202 may additionally be used as a ruler.

At the intersection of two uniquely shaped rectangle edges are two slits 212, which extend the first side 204 into the body 112 and the second side 206 into the body to allow for cutting corners into the fabric or material. In some embodiments, the body 112 is marked with cutting instructions for the user.

In the embodiment shown, a user may place the multi-irregular-sided combination measuring and corner cutting template 202 on one or more layers of fabric or material and cut along the inside edge of the first side 204, such that a cutting device may cut through fabric or material along the edge of a fabric or material, and cease cutting the fabric or material at the point where the slit 212 meets the fabric or material and then cut along the inside edge of the second side 206, such that a cutting device may cut through fabric or material along the edge of a fabric or material, and cease cutting the fabric or material at the point where the slit 212 meets the fabric or material. This forms the first corner at the bottom of a first side of the bag being constructed. The same part of the template is then rotated and lined up such that a corresponding box corner can be cut into the fabric at the opposite lower edge of the bag thereby forming the second corner on the second side of the bag. This particular template is useful in cutting the required pre measured squares in fabric or material, allowing the rotary cutter to not cut into the corners of fabric or material yardage which shortens the preparation time for the quilter to cut layers of fabric or materials as well as cut, sort and store the desired cut sizes for future use.

Furthermore, the embodiment shown displays the body of the multi-irregular-sided combination measuring and corner cutting template 202 is shown containing a hole 214, which may be coupled to a hook, pinned to a corkboard via a pin, or coupled to any other storage apparatus known in the art. By using the corner cutting device to cut a corner in fabric or material, the user does not cut passed the edge of the ruler and cut into the surrounding or edge of the fabric or material or stop short at the user's desired corner or require to proceed to complete the cut with scissors to the inside corner edges.

FIG. 2B illustrates a top view 200*b* of a multi-irregular-sided combination measuring and corner cutting template 222 fabric cutting device according to some embodiments. Similar to FIG. 2A, the multi-irregular-sided combination measuring and corner cutting template 222 shown has four uniquely sized squares in each corner. The dimensions are different from those in FIG. 2A, in that these are 1", 1.5", 2" and 2.5". The templates may be marked out in metric measurements in place of imperial measurements.

FIG. 2C illustrates a top view 200*c* of a multi-irregular-sided combination measuring and corner cutting template 224 fabric cutting device according to some embodiments. Similar to FIG. 2A and FIG. 2B, FIG. 1C contains four uniquely shaped squares of different dimensions, shown here as 3", 3.5", 4" and 4.5" in order to accommodate a variety of unique box corners for the user.

FIG. 2D illustrates a top view 200*d* of an L-shaped combination measuring and corner cutting template 216 fabric cutting device according to some embodiments. In the embodiment shown, the L-shaped combination measuring and corner cutting template 216 contains measuring increments 210 along several of the outer edges for measuring lengths of fabric or material and a plurality of slits 212, which allows for cutting corners into the fabric or material, at the upper intersection of the vertical and horizontal members of the L-shaped combination measuring and corner cutting template 216. As well, a plurality of angle indicators 218 extend out from the intersection in plane with a respective slit 212 throughout the body 220 of the L-shaped combination measuring and corner cutting template 216 that allow for cutting fabric or material corners at a variety angles, including, but not limited to; 30, 45, 60, and 90 degree angles.

FIG. 3A illustrates a top view 300*a* of a single end zipper template 306 fabric cutting device according to some embodiments.

Zipper templates are designed for the user to be able to cut out a rectangular hole with precision for accurate cuts easily. Normally the user will draw the rectangle where the zipper is to be sewn in place, then cut out with scissors. The single end zipper template 306 allows the user to cut a rectangular hole 304 easily eliminating any drawing and allows the user to quickly use a rotary blade to cut the rectangular hole 304 very quickly, accurately and easily.

When using fabric or material that ravels and requires the edge to be sewn and reinforced for a zipper, these are the cut lines that once the rectangular hole 304 is drawn and sewn. The user cuts along the inside edges 320, slits 302 and cross cuts 318 with the rotary cutter very quickly, accurately and easily. Then the fabric or material is turned right sides out and the zipper is sewn in place. The single end zipper template 306 allows the user the option to cut the rectangular hole 304 required for the zipper by cutting one side and rotating the template 180 degrees and lining up the edges to cut to the desired length of the zipper required.

This particular template is a combination of the embodiments shown in FIGS. 3B and 3C. Essentially allowing the user to cut either type of zipper template by cutting a desired first template hole and then rotating the template to cut the similar second end.

FIG. 3B illustrates a top view 300*b* of a double end zipper template 308 fabric cutting device according to some embodiments. The double end zipper template 308 allows the user to have sewn the rectangular hole 304 and then places the template on the fabric or material lining up the rectangular hole 304 placement and then can cut the required center line 322 and the cross cuts 318 with the rotary cutter both sides of the rectangular hole 304 required for fabric or material that ravels and requires the edge to be sewn and reinforced for a zipper. The user would then turn the fabric or material inside out and apply the zipper.

Different sized versions of the embodiment illustrated in FIG. 3B can be used to cut bound buttonholes or bound pockets on jackets and other garments.

FIG. 3C illustrates a top view 300*c* of a single zipper template 312 fabric cutting device according to some embodiments. In the embodiment shown, the single zipper template 312 contains a rectangular hole 304 with a pair of slits 302 at each corner allowing for a user to cut along the inner edges of the single zipper template 312 and extend past the edge and onto the body 316 use each of the in the middle wherein the four slits 302 form a rectangle. Moreover, the single zipper template 312 is shown with a plurality of measuring increments 314 along the outer edges and the inner edges of the single zipper template 312.

A zipper template may preferably be placed on top of a piece of fabric or material, and a cutting device may cut along the rectangular hole 304, stopping at the ends of each slit 302, resulting in a rectangular hole in the piece of fabric or material. A zipper may then be sewn into the piece of fabric, the zipper being visible through the rectangular hole in the piece of fabric or material. Fabric or material such as leather, vinyl, cork etc. that will not fray and has a "finished edge", may preferably be used for placing zippers.

FIG. 3D illustrates a top view 300*d* of a multi-sized zipper template 310 fabric cutting device according to some embodiments. This embodiment displays 3 separate rectangular holes 304 within the body 316 which allows for the user to work on a variety of sizes of zippers on a single template.

FIG. 4A illustrates a top view 400*a* of a pentagon shaped corner cutting template 404 fabric cutting device according to some embodiments. In the embodiment shown, wherein five outer edges 406 and five inner edges 410 form an outer shell of a pentagon, with a pentagon shaped insert 408. The pentagon shaped corner cutting template 404 has five perpendicular pairs of slits 402, at each intersection of the five inner edges 410 for allowing the user to cut past the intersection without needlessly cutting additional fabric or material.

A user may place the pentagon shaped corner cutting template 404 on top of one or more layers of fabric or material and cut along the inner edges 410 of the template, into the slits 402, to precisely cut a pentagon shape from the fabric or material.

Alternatively, a user may trace or cut along the outer edge 406 or the pentagon shaped insert 408, if precise cuts are not required. In an alternate embodiment, the pentagon shaped corner cutting template 404 doesn't contain a pentagon shaped insert 408. In an alternate embodiment, the pentagon shaped corner cutting template 404 doesn't contain a pentagon shaped outer element with slits that surround the pentagon shaped insert 408.

FIG. 4B illustrates a top view 400*b* of an irregular rectangle shape corner cutting template 412 according to some embodiments. In the embodiment shown, wherein five outer edges 406 and four inner edges 410 form an outer shell of an irregularly shaped rectangle, with an irregular rectangle shape insert 414. The irregular rectangle shape corner cutting template 412 has four pairs of slits 402 at each intersection of the four inner edges 410 for allowing the user to cut past the intersection without needlessly cutting into surrounding fabric or material of using additional fabric or material. The irregular rectangle shape corner cutting template 412 also has two slits 402 at the top corner aligned on an angle in order to cut the corner and add an additional side to the shape. The two slits aligned on the top corner trim the excess fabric from the corner to save time in that the user no longer needs to trim the corners after the patchwork pieces have been stitched together saving significant cutting time for the user.

A user may place the irregular rectangle shape corner cutting template 412 on top of one or more layers of fabric or material and cut along the inner edges 410 of the template, into the slits 402, to precisely cut an irregularly rectangle shape from the fabric or material.

Alternatively, a user may trace or cut along the outer edge 406 or the irregular rectangle shape insert 414, if precise cuts are not required. In an alternate embodiment, the irregular rectangle shape corner cutting template 412 doesn't contain an irregular rectangle shape insert 414.

FIG. 4C illustrates a top view 400*c* of an isosceles triangle shaped corner cutting template 416 according to further embodiments. In the embodiment shown, wherein seven outer edges 406 and three inner edges 410 form an outer shell of an isosceles triangle with two blunted corners, with an isosceles triangle shaped insert 418. The isosceles triangle shaped corner cutting template 416 has a pair of slits 402 at the apex of the inner edges 410 for allowing the user to cut past the intersection without needlessly cutting into surrounding fabric or material of using additional fabric or material. The isosceles triangle shaped corner cutting template 416 also has 6 slits 402 at the top and 6 slits 402 the bottom opposing corner in order to cut the corner and add two additional sides to the shape.

A user may place the isosceles triangle shaped corner cutting template 416 on top of one or more layers of fabric or material and cut along the inner edges 410 of the template, into the slits 402, to precisely cut an isosceles triangle with two blunted corners to prevent the need for further trimming of the fabric or material after stitching.

Alternatively, a user may trace or cut along the outer edge 406 or the isosceles triangle shaped insert 418, if precise cuts are not required. In an alternate embodiment, the isosceles triangle shaped corner cutting template 416 doesn't contain an isosceles triangle shaped insert 418.

FIG. 4D illustrates a top view 400*d* of a right-angle triangle shaped corner cutting template 420 according to additional embodiments. In the embodiment shown, wherein six outer edges 406 and five inner edges 410 form an outer shell of a right-angle triangle with two blunted corners, with a right-angle triangle shaped insert 422. The right-angle triangle shaped corner cutting template 420 has a pair of perpendicular slits 402 at the bottom of the inner edges 410 for allowing the user to cut past the intersection without needlessly cutting into surrounding fabric or material of using additional fabric or material. The right-angle triangle shaped corner cutting template 420 also has 6 slits 402 at the top and 4 slits 402 at the left bottom in order to cut the corners and add three additional sides to the shape.

A user may place the right-angle triangle shaped corner cutting template 420 on top of one or more sheets of fabric or material and cut along the inner edges 410 of the template, into the slits 402, to precisely cut a right-angle triangle with two blunted corners shape from the fabric or material.

Alternatively, a user may trace or cut along the outer edge 406 or the right-angle triangle shaped insert 422, if precise cuts are not required. In an alternate embodiment, the right-angle triangle shaped corner cutting template 420 doesn't contain a right-angle triangle shaped insert 422.

FIG. 4E illustrates a top view 400*e* of an irregular pentagon shaped corner cutting template 424 fabric cutting device according to some embodiments. In the embodiment shown, wherein six outer edges 406 and six inner edges 410 form an outer shell of an irregularly shaped pentagon, with an irregular pentagon shaped insert 426. The irregular pentagon shaped corner cutting template 424 has six pairs of slits 402, at each intersection of the six inner edges 410, for allowing the user to cut past the intersection without needlessly cutting into surrounding fabric or material of using additional fabric or material.

A user may place the irregular pentagon shaped corner cutting template 424 on top of one or more sheets of fabric or material and cut along the inner edges 410 of the template, into the slits 402, to precisely cut an irregular pentagon shape from the fabric.

Alternatively, a user may trace or cut along the outer edge 406 or the irregular pentagon shaped corner cutting template 424, if precise cuts are not required. In an alternate embodiment, the irregular pentagon shaped corner cutting template 424 doesn't contain an irregular pentagon shaped insert 426.

FIG. 4F illustrates a top view 400*f* of a coffin shaped corner cutting template 428 fabric cutting device according to some embodiments. In the embodiment shown, wherein six outer edges 406 and six inner edges 410 form an outer shell of a coffin shape, with a coffin shaped insert 430. The coffin shaped corner cutting template 428 has six pairs of slits 402, at each intersection of the six inner edges 410, for allowing the user to cut past the intersection without needlessly cutting into surrounding fabric or material of using additional fabric or material.

A user may place the coffin shaped corner cutting template 428 on top of one or more sheets of fabric or material and cut along the inner edges 410 of the template, into the slits 402, to precisely cut a coffin shape from the fabric or material.

Alternatively, a user may trace or cut along the outer edge 406 or the coffin shaped corner cutting template 428, if precise cuts are not required. In an alternate embodiment, the coffin shaped corner cutting template 428 doesn't contain a coffin shaped insert 430.

FIG. 4G illustrates a top view 400*g* of a trapezoid shaped corner cutting template 432 fabric cutting device according to some embodiments. In the embodiment shown, wherein six outer edges 406 and six inner edges 410 form an outer shell of a trapezoid shape with two blunted corners, with a trapezoid shaped insert 434. The trapezoid shaped corner cutting template 432 has six pairs of slits 402, at each intersection of the six inner edges 410 for allowing the user to cut past the intersection without needlessly cutting into surrounding fabric or material of using additional fabric or material.

A user may place the trapezoid shaped corner cutting template 432 on top of one or more sheets of fabric or material and cut along the inner edges 410 of the template, into the slits 402, to precisely cut a trapezoid with two blunted corners shape from the fabric or material.

Alternatively, a user may trace or cut along the outer edge 406 or the trapezoid shaped corner cutting template 432, if precise cuts are not required. In an alternate embodiment, the trapezoid shaped corner cutting template 432 doesn't contain a trapezoid shaped insert 434.

FIG. 4H illustrates a top view 400*h* of a diamond shaped corner cutting template 436 fabric cutting device according to some embodiments. In the embodiment shown, wherein six outer edges 406 and six inner edges 410 form an outer shell of a diamond with two blunted corners, with a diamond shaped insert 438. The diamond shaped corner cutting template 436 has six pairs of slits 402, at each intersection of the six inner edges 410 for allowing the user to cut past the intersection without needlessly cutting into surrounding fabric or material of using additional fabric or material.

A user may place the diamond shaped corner cutting template 436 on top of one or more sheets of fabric or material and cut along the inner edges 410 of the template, into the slits 402, to precisely cut a diamond with two blunted corners shape from the fabric or material.

Alternatively, a user may trace or cut along the outer edge 406 or the diamond shaped corner cutting template 436, if precise cuts are not required. In an alternate embodiment, the diamond shaped corner cutting template 436 doesn't contain a diamond shaped insert 438.

FIG. 4I illustrates a top view 400*i* of an equilateral triangle shaped corner cutting template 440 fabric cutting device according to some embodiments. In the embodiment shown, six outer edges 406 and six inner edges 410 form an outer shell of an equilateral triangle with three blunted corners, with an equilateral triangle shaped insert 442. The equilateral triangle shaped corner cutting template 440 has six pairs of slits 402, at each intersection of the six inner edges 410 for allowing the user to cut past the intersection without needlessly cutting into surrounding fabric or material of using additional fabric or material.

A user may place the equilateral triangle shaped corner cutting template 440 on top of one or more sheets of fabric or material and cut along the inner edges 410 of the template, into the slits 402, to precisely cut an equilateral triangle with three blunted corners shape from the fabric or material.

Alternatively, a user may trace or cut along the outer edge 406 or the equilateral triangle shaped corner cutting template 440, if precise cuts are not required. In an alternate embodiment, the equilateral triangle shaped corner cutting template 440 doesn't contain an equilateral triangle shaped insert 442.

FIG. 5A illustrates a top view 500*a* of a hexagon shaped corner cutting template 518 fabric cutting device according to some embodiments. In the embodiment shown, wherein six outer edges 510 and six inner edges 528 form an outer shell of a hexagon shape, with a hexagon shaped insert 514. The hexagon shaped corner cutting template 518 has six perpendicular pairs of slits 512, at each intersection of the six inner edges 528 for allowing the user to cut past the intersection without needlessly cutting into surrounding fabric or material of using additional fabric or material.

A user may place the hexagon shaped corner cutting template 518 on top of one or more layers of fabric or material and cut along the inner edges 516 of the template, into the slits 512, to precisely cut a hexagon shape from the fabric or material.

Alternatively, a user may trace or cut along the outer edge 510 or the hexagon shaped corner cutting template 518, if precise cuts are not required. In an alternate embodiment, the hexagon shaped corner cutting template 518 doesn't contain a hexagon shaped insert 514.

FIG. 5B illustrates a top view 500*b* of a hexagon shaped corner cutting template 518 fabric cutting device coupled to the hexagon shaped insert 514, according to some embodiments.

FIG. 5C illustrates a top view 500*c* of a hexagon shaped corner cutting template 518 fabric cutting device coupled to a piece of fabric 508, according to some embodiments. In the embodiment shown, the hexagon shaped corner cutting template 518 is placed on top of a piece of fabric 508 prior to cutting the fabric 508. The hexagon shaped insert 514 has been removed from the center of the hexagon shaped corner cutting template 518 and the fabric 508 may be aligned such that the fabric 508 completely encompasses the center of the hexagon shaped corner cutting template 518.

FIG. 5D illustrates a perspective view 500*d* of a fabric cutting device 502 fabric cutting device being applied to a hexagon shaped corner cutting template 518 coupled to a piece of fabric 508, according to some embodiments. In the embodiment shown, the fabric cutting device 502 cuts through the exposed portion of the fabric 508, the inner portion 506, by cutting along the inner edges 516 and into each slit 512 where the user ceases cutting. After cutting all of the inner edges 516, the inner portion 506 of the fabric 508 is cut out of the outer portion 504 of the fabric 508.

FIG. 5E illustrates a perspective view 500*e* of an inner portion 506 of a fabric 508 after being cut, according to some embodiments.

FIG. 6A illustrates a top view 600*a* of a multi-shaped corner cutting template 604 fabric cutting device according to some embodiments. In the embodiment shown, a multi-shaped corner cutting template 604 is shown as a square with a triangle portion 606 absent from the square. Two slits 602 are shown extending from the apex of the triangle portion 606, where one slit 602 extends along one of the edges 608 of the triangle portion 606 and the other slit 602 extends along the other edge 608 of the triangle portion 606. The multi-shaped corner cutting template 604 may be employed to allow the user to cut fabric or material without needlessly cutting into surrounding fabric or using additional fabric as well setting up a cut for one or more other shapes during the use of the multi-shaped corner cutting template 604. In some embodiments, the length of the edge 608 and the longer slit 602 is 6.7132" while the length of the other edge 608 and the shorter slit 602 is 3.0531" for a 10" by 10" square of fabric.

FIG. 6B illustrates a top view 600*b* of a multi-shaped corner cutting template 604 fabric cutting device according to some embodiments. In some embodiments, the multi-shaped corner cutting template 604 may be employed to cut up to four triangle shapes 612, up to four irregular five-sided shapes 610 and a square shape 614.

One method of utilizing the multi-shaped corner cutting template 604 is as follows:

1. Placing the layered fabric or material pieces onto a cutting mat with the straight edge 608 at the bottom. Placing the multi-shaped corner cutting template 604 on the layered fabric or material, matching and lining up the four outside corners exactly with the four corners of the layered fabric or material.
2. Holding the multi-shaped corner cutting template 604 in place and placing a rotary cutter blade along the right inside edges 608 of the shorter side and cutting from the bottom right inside edge 608 cutting upwards along the inside edge 608 and into the slit 602. Placing the rotary cutter along the left inside edge 608 cutting upwards along the inside edge 608, cutting to the full length of the slit 602. The user may find it easier to rotate the cutting mat for ease of cutting.
3. Very carefully, lifting the multi-shaped corner cutting template 604, keeping the layers of the fabric or material in place, and rotating the cutting mat 90 degrees to the left or right. The bottom of the layered fabric or material square should be at the bottom and the multi-shaped corner cutting template 604 placed on top of the layers of fabric or material and holding down the multi-shaped corner cutting template 604, checking and lining up of all four corners of the layered fabric or materials and the multi-shaped corner cutting template 604 and repeating the cuts from step 2.
4. Repeating the previous steps until all four sides have been cut. With practice all the layered pieces of fabric or materials will be cut efficiently, with accuracy and ease.
5. Removing the layered cut fabric or material pieces and placing them on another surface area to sort into colors and repeat cutting process until all the squares have been cut. Separating layers of fabric into colors and label each color with color number for pattern placement.

In some embodiments, the cutout triangle shapes 612 and square shape 614 may be placed in a safe place for an alternate pattern or use in the border of the quilt top. If the layered fabric or material's four outside edges 608 do not line up exactly with the multi-shaped corner cutting template 604 four outside corners, the multi-shaped corner cutting template 604 should be placed evenly on the center of the layered fabric or material as much as possible to achieve the best equal cuts of all the layered pieces.

In some embodiments, cutting four layers of fabric or material is recommended, but this dependent on the thickness of each layer. Less layers may result in the fabric or material moving or shifting too much or small "cuts" into the surrounding fabric may result. More than four layers of fabric or material may result in "cuts" not cutting far enough into the corner/line. It may be best to practice on scrap fabrics or materials until you find the best number of layers you are able to achieve the correct length of cuts.

FIG. 7A shows a side cross-sectional view of a slit 102 in accordance with one embodiment of the invention.

The slit 102 in the template has an upper edge of template slit 704, a lower edge of template slit 706, an open end of template slit 708 and a closed end of template slit 702. The rotary cutter stop point 716 corresponds to the intersection of the upper edge of template slit 704 and the closed end of template slit 702. In this particular embodiment, the thickness of the template and the diameter of the rotary cutter results in the end of fabric cut 712 corresponding to the open end of template slit 708.

FIG. 7B shows a side cross-sectional view of a slit 102 in accordance with one embodiment of the invention.

This figure shows the direction of movement of rotary cutter 714 into the slit 102. It can be seen that the dimensions of the thickness of the template and the diameter of the rotary cutter 710, results in the fabric 508 cut terminating at the open end of template slit 708.

This particular arrangement is chosen when the fabric cut is not to extend beyond the intersecting edges of the internal voided area of a template, as illustrated in FIGS. 2A-2C, 3A-3D and 4A.

FIG. 8A shows a side cross-sectional view of a slit 102 in accordance with one embodiment of the invention.

The slit 102 in the template has an upper edge of template slit 704, a lower edge of template slit 706, an open end of template slit 708 and a closed end of template slit 702. The rotary cutter stop point 716 corresponds to the intersection of the upper edge of template slit 704 and the closed end of template slit 702. In this particular embodiment, the length of the template slit 702 and the diameter of the rotary cutter results in the end of fabric cut 712 corresponding to a mid point along the lower edge of template slit 702.

FIG. 8AB shows a side cross-sectional view of a slit 102 in accordance with one embodiment of the invention.

This figure shows the direction of movement of rotary cutter 714 into the slit 102. It can be seen that the length of the template slits 702 and the diameter of the rotary cutter 710, results in the fabric 508 cut terminating at a mid-point along the lower edge of template slit 716 or allows the user placing the template slits to the desired length of the slit cuts on 508. The length of 802 will vary depending on the user's desired cut length.

This particular arrangement is chosen when the fabric cut is intended to extend into the slit 102, for example for rag edges, as illustrated in FIGS. 1A-1D.

The relative dimensions of the diameter of the rotary cutter, the thickness of the template, and the length of the slit will affect the point at which the lower cutting surface of the rotary cutter stops cutting. Many quilters cut several layers of fabric, using a rotary cutter, at the same time, and under these circumstances, the thickness of the fabric will also affect the point at which the rotary cutter stops cutting the fabric.

In some embodiments, a kit is provided for precisely cutting and measuring one or more fabrics. The kit may comprise a plurality of sizes of similar shaped templates.

Other embodiments of kits may contain different sized and shaped templates that when arranged in specific order produce a specific pattern, such as a bear's paw, anvil, bird's eye view, braced star, chevron, etc.

The kits may also contain one or more of scissors, rotary cutters, pins, instructions for use and in some embodiments, fabric squares including layer cakes of fabric.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. As can be understood, the examples described above are intended to be exemplary only.

The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

The term “connected”, “attached”, “affixed” or “coupled to” may include both direct coupling (in which two elements that are coupled to each other contact each other) and indirect coupling (in which at least one additional element is located between the two elements).

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A fabric cutting template for precisely cutting one or more layers of fabric using a rotary cutter, said template comprising:

a planar body having a plurality of cutting edges defining a shape; and a plurality of slits extending into said template from one or more of said plurality of said cutting edges, with said plurality of slits comprising matching pairs of slits located at each intersection of two of said plurality of cutting edges, with each slit in said matching pair of slits running parallel to one of said two cutting edges, wherein said one or more slits have a width that can accommodate a width of said rotary cutter and a predetermined length that extends into said template to a distance that determines a stop point for said precise cutting.

2. The cutting template of claim 1, wherein said template is composed of transparent material.

3. The cutting template of claim 2, wherein said transparent material is acrylic or colored acrylic.

4. The cutting template of claim 1, wherein said one or more of said plurality of cutting edges, that are connected to said one or more slits, are an inner edge or inner edges of said template, wherein said shape is formed by including said inner edge or inner edges.

5. The cutting template of claim 1, wherein said edge connected to said one or more slits is an outer edge.

6. The cutting template of claim 1, wherein said one or more slits are formed from straight lines.

7. The cutting template of claim 1, wherein said one or more slits are formed from curved lines.

8. The cutting template of claim 1, wherein said body is marked with measurement increment.

9. The cutting template of claim 1, wherein said body is marked with dimensions.

10. The cutting template of claim 1, wherein said body is marked with angles.

11. The cutting template of claim 1, wherein said body is marked with cutting instructions.

12. The cutting template of claim 1, wherein said body contains a hole for coupling to a storage apparatus.

13. The cutting template of claim 1, wherein said template is applied on top of more than one layer of said fabric.

14. The cutting template of claim 1, wherein said slits are equally spaced apart.

15. The cutting template of claim 1, wherein the one or more slits lengths are different sizes to accommodate different sized rotary cutters.

16. The cutting template of claim 1, wherein the one or more slits widths are different sizes to accommodate different sized rotary cutters.

17. A kit for precisely cutting and measuring one or more layers of fabric, comprising, in combination:

one or more for the templates of claim 1; and a set of instructions for applying the templates to the one or more fabrics.

18. The kit of claim 17, wherein the one or more templates are different sized and shaped templates that, when arranged in specific order, produce a specific pattern.

19. The cutting template of claim 1, wherein said one or more slits are formed from various angled lines.

* * * * *